(12) United States Patent
Ebiyama

(10) Patent No.: US 10,303,676 B2
(45) Date of Patent: May 28, 2019

(54) TRANSACTION PROCESSING APPARATUS, TRANSACTION PROCESSING METHOD, AND COMPUTER-READABLE RECORDING MEDIUM

(71) Applicant: NEC CORPORATION, Tokyo (JP)

(72) Inventor: Tomoo Ebiyama, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 629 days.

(21) Appl. No.: 14/938,971

(22) Filed: Nov. 12, 2015

(65) Prior Publication Data
US 2016/0140160 A1    May 19, 2016

(30) Foreign Application Priority Data

Nov. 13, 2014 (JP) ................. 2014-230846

(51) Int. Cl.
G06F 17/30 (2006.01)
G06F 16/23 (2019.01)

(52) U.S. Cl.
CPC ...... *G06F 16/2343* (2019.01); *G06F 16/2365* (2019.01)

(58) Field of Classification Search
CPC .................... G06F 17/30362; G06F 17/30371
See application file for complete search history.

(56) References Cited

U.S. PATENT DOCUMENTS

| 6,625,601 B1 * | 9/2003 | Molloy ................... G06F 9/466 |
| 2007/0118523 A1 | 5/2007 | Bresch et al. |
| 2007/0239915 A1 | 10/2007 | Saha et al. |
| 2011/0246503 A1 * | 10/2011 | Bender .......................... 707/769 |

FOREIGN PATENT DOCUMENTS

| JP | 5-257792 A | 10/1993 |
| JP | H06-19769 A | 1/1994 |
| JP | 2008-165370 A | 7/2008 |
| JP | 2009-37544 A | 2/2009 |
| JP | 2014178831 A | 9/2014 |
| WO | 2013046883 A1 | 4/2013 |

OTHER PUBLICATIONS

Ullman, Principles of Database and Knowledges Base Systems, vol. 1, pp. 467-535 (Year: 1988).*
Yamamoto, "Practice of the load test & performance verification for truth and Web-DB system stable employment", DB Magazine, Shoeisha Co., Ltd., Aug. 1, 2006, the 16th volume, No. 4, pp. 87-99, 15 pages total.
Decision to Grant a Patent dated Oct. 30, 2018 issued by the Japanese Patent Office in counterpart application No. 2014-230846, 4 pages.
Communication dated Jul. 3, 2018, issued by the Japan Patent Office in corresponding Japanese Application No. 2014-230846.

\* cited by examiner

*Primary Examiner* — Albert M Phillips, III
(74) *Attorney, Agent, or Firm* — Sughrue Mion, PLLC

(57) ABSTRACT

The transaction processing apparatus (100) includes: a transaction analyzer (101) that determines whether or not a transaction is a transaction that acquires a lock to operate and specifies, on a data storage device (200), data that is to be accessed by the transaction; a lock manager (102) that causes, if the transaction acquires a lock to operate, this transaction to acquire the lock; and a transaction executor (103) that executes this transaction on the condition that another transaction other than this transaction has not acquired the lock, and updates, based on the execution result, the data that is to be accessed.

9 Claims, 16 Drawing Sheets

Fig.11

| Transaction number | Number of retries | Average execution time period (millisecond) |
|---|---|---|
| S01-003 | 5 | 2,000 |
| S03-005 | 12 | 300 |
| S02-015 | 1 | 1,200 |
| S01-008 | 3 | 10,000 |
| S04-001 | 8 | 750 |

TRANSACTION PROCESSING APPARATUS, TRANSACTION PROCESSING METHOD, AND COMPUTER-READABLE RECORDING MEDIUM

CROSS-REFERENCE TO RELATED APPLICATION

This disclosure is based upon and claims the benefit of priority from Japanese patent application No. 2014-230846, filed on Nov. 13, 2014, the disclosure of which is incorporated herein in its entirety by reference.

BACKGROUND

1. Field of the Invention

The present disclosure relates to a transaction processing apparatus that processes a transaction in cooperation with a database, a transaction processing method, and a computer-readable recording medium having recorded thereon a program for realizing the same.

2. Related Art

In recent years, a system using multiple computers, that is, a so-called cloud system that serves as a scalable platform for execution of applications attracts attention. Furthermore, KVS (Key Value Store) is widely known as scalable data persistence means in the infrastructure of the cloud system.

KVS is a data store in which a unique label (key) is set in association with data (value) that is to be stored, and they are stored as a pair (KV pair). Also, particularly, one type of KVS is referred to as a "distributed KVS", which has a function in which data can be stored in a plurality of server devices or storage devices in a distributed manner.

Furthermore, in KVS, an exclusive control method that is referred to as an optimistic exclusive control method and an exclusive control method that is referred to as a pessimistic exclusive control method are known as exclusive control methods for a transaction.

Of them, the optimistic exclusive control method is an exclusive control method that does not acquire a lock for data that is to be referenced or updated at the time of execution of a transaction. In the optimistic exclusive control method, when committing the transaction, it is checked whether or not the transaction competes against another transaction, and the commitment is settled if there is no competition, whereas the transaction is aborted if there is the competition.

On the other hand, the pessimistic exclusive control method is an exclusive control method that acquires a lock for data that is to be referenced or updated at the time of execution of a transaction. In the pessimistic exclusive control method, once a lock is acquired, another transaction is not executed until the corresponding transaction ends, and thus according to this method, it is possible to reliably control the competition between the transactions.

Of these exclusive control methods, the optimistic exclusive control method has the characteristics of excellence in scalability because no lock is acquired, which does not incur costs for lock management. Accordingly, many systems using KVS employ the optimistic exclusive control.

However, in a system that employs the optimistic exclusive control method, transactions often compete against each other when a specific KV pair is intensively updated, causing the disadvantage that an overhead increases due to retries of a transaction that has failed to be committed. Furthermore, in view of the property of the optimistic exclusive control method, a long transaction is likely to fail and it is possible that the commitment of this transaction never becomes successful.

On the other hand, when a system employs the pessimistic exclusive control method, although a failure in commitment due to a competition between transactions does not occur, there is the disadvantage that lock management serves as a bottleneck and the scalability of the system decreases.

SUMMARY

According to an aspect of one or more embodiments, there is provided a transaction processing apparatus including: a transaction analyzer that analyzes an execution target transaction to determine whether or not the execution target transaction is a transaction that acquires a lock to operate, and specifies, on a database, data that is to be accessed by the execution target transaction; a lock manager that causes, if the execution target transaction is a transaction that acquires a lock to operate, the execution target transaction to acquire a lock; and a transaction executor that executes the execution target transaction on the condition that another transaction other than the execution target transaction has not acquired the lock, and updates, based on an execution result, the specified data that is to be accessed by the execution target transaction.

Furthermore, according to an aspect of one or more embodiments, there is provided a transaction processing method including the steps of: (a) analyzing an execution target transaction to determine whether or not the execution target transaction is a transaction that acquires a lock to operate, and specifying, on a database, data that is to be accessed by the execution target transaction; (b) causing, if the execution target transaction is a transaction that acquires a lock to operate, the execution target transaction to acquire a lock; and (c) executing the execution target transaction on the condition that another transaction other than the execution target transaction has not acquired the lock, and updating, based on an execution result, the specified data that is to be accessed by the execution target transaction.

Furthermore, according to an aspect of one or more embodiments, a non-transitory computer-readable recording medium has recorded thereon a program including an instruction for causing a computer to execute the steps of: (a) analyzing an execution target transaction to determine whether or not the execution target transaction is a transaction that acquires a lock to operate, and specifying, on a database, data that is to be accessed by the execution target transaction; (b) causing, if the execution target transaction is a transaction that acquires a lock to operate, the execution target transaction to acquire a lock; and (c) executing the execution target transaction on the condition that another transaction other than the execution target transaction has not acquired the lock, and updating, based on an execution result, the specified data that is to be accessed by the execution target transaction.

BRIEF DESCRIPTION OF THE DRAWINGS

FIG. 11 is a diagram illustrating examples of information on the numbers of retries and average execution time periods that are managed in Embodiment 2.

DETAILED DESCRIPTION

Embodiment 1

Hereinafter, a transaction processing apparatus, a transaction processing method, and a program according to Embodiment 1 will be described with reference to FIGS. 1 to 9.

Figure 1:
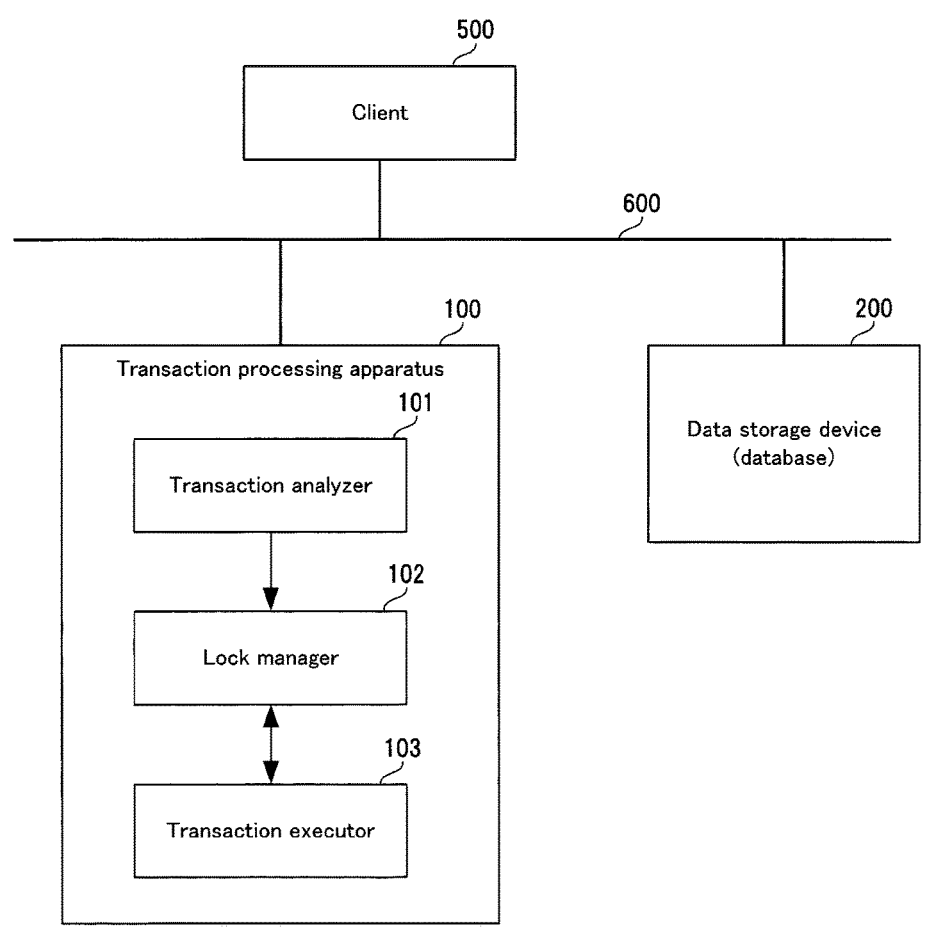
FIG. 1 is a block diagram illustrating a schematic configuration of a transaction processing apparatus according to Embodiment 1.

First, a configuration of the transaction processing apparatus according to Embodiment 1 will be described. FIG. 1 is a block diagram illustrating a schematic configuration of the transaction processing apparatus according to Embodiment 1.

As shown in FIG. 1, the transaction processing apparatus 100 of Embodiment 1 is connected to a client 500 and a data storage device 200 serving as a database via a network 600. The client 500 inputs a transaction that is to be executed (hereinafter, referred to as "execution target transaction") to the transaction processing apparatus 100. The transaction processing apparatus 100 accepts the execution target transaction that was input from the client 500, and processes the accepted execution target transaction.

Furthermore, as shown in FIG. 1, the transaction processing apparatus 100 includes a transaction analyzer 101, a lock manager 102, and a transaction executor 103. Of them, the transaction analyzer 101 first analyzes the execution target transaction, and determines whether or not this execution target transaction is a transaction that acquires a lock to operate. Then, the transaction analyzer 101 specifies data on the data storage device 200 that is to be accessed by the execution target transaction.

Also, the lock manager 102 causes the execution target transaction to acquire a lock if the execution target transaction is a transaction that acquires a lock to operate. The transaction executor 103 executes the execution target transaction on the condition that another transaction other than the execution target transaction has not acquired the lock. Furthermore, the transaction executor 103 updates, based on an execution result, the specified data that is to be accessed by the execution target transaction.

As described above, in Embodiment 1, in principle, even in the case where the optimistic exclusive control method is employed, when a transaction that is to acquire a lock is input, the lock for this transaction will be acquired. On the other hand, if another transaction has acquired the lock, even the execution target transaction will not be executed since the execution target transaction cannot acquire the lock. Therefore, according to Embodiment 1, an increase in overhead caused when update processing is concentrated is suppressed. Furthermore, according to Embodiment 1, since the optimistic exclusive control method can be employed, a reduction in scalability can be suppressed at the same time.

Figure 2:
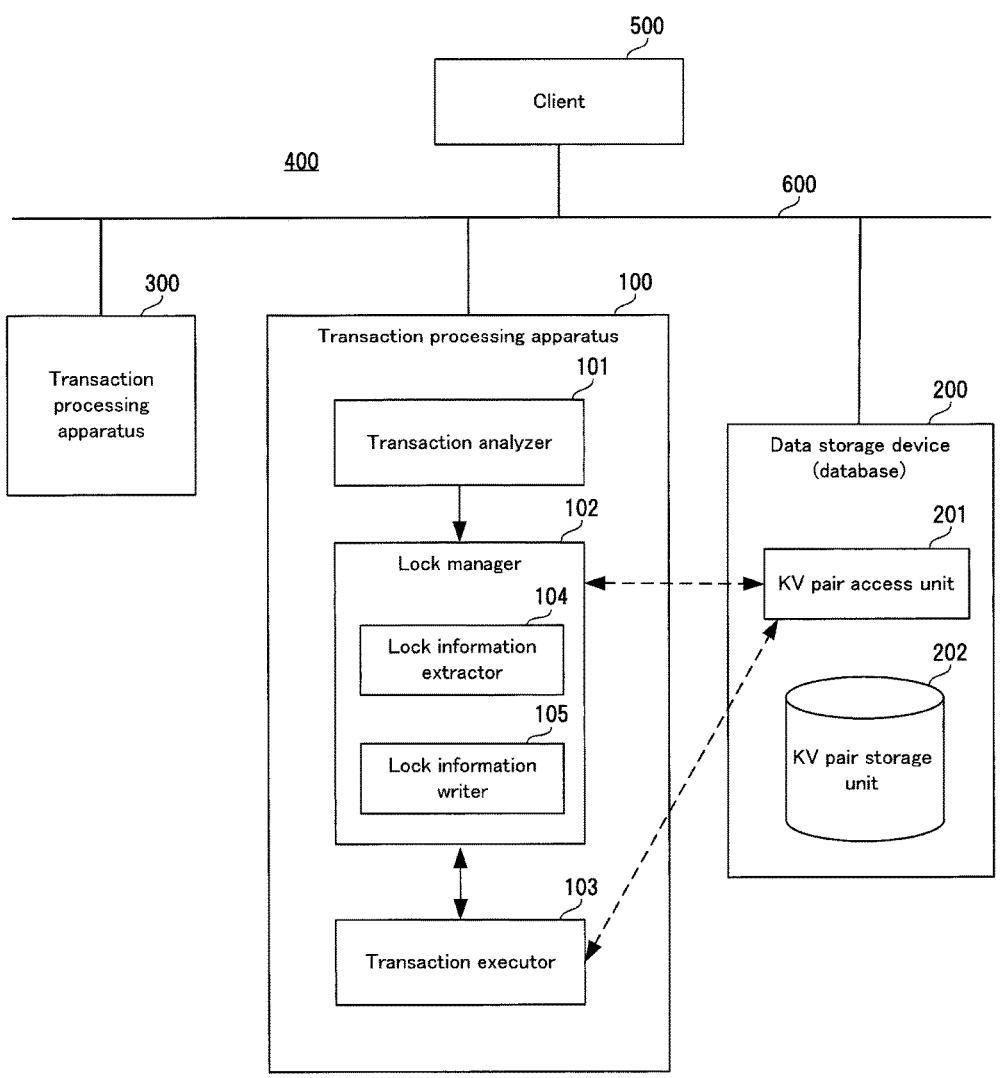
FIG. 2 is a block diagram illustrating a specific configuration of the transaction processing apparatus according to Embodiment 1.

The following will further specifically describe the configuration of the transaction processing apparatus of Embodiment 1 with reference to FIG. 2. FIG. 2 is a block diagram illustrating a specific configuration of the transaction processing apparatus of Embodiment 1.

As shown in FIG. 2, in Embodiment 1, the transaction processing apparatus 100 is connected to not only the data storage device 200 and the client 500 but also another transaction processing apparatus 300 via the network 600. Also, the transaction processing apparatus 100 constitutes, together with the data storage device 200 and the transaction processing apparatus 300, a distributed transaction processing system 400.

Also, the transaction processing apparatus 300 has a similar configuration to that of the transaction processing apparatus 100. Accordingly, in the following, the description of the transaction processing apparatus 100 is also applied to the transaction processing apparatus 300.

Furthermore, in Embodiment 1, both the transaction processing apparatus 100 and the transaction processing apparatus 300 can be configured by programs, which will be described later. In this case, the transaction processing apparatus 100 and the transaction processing apparatus 300 may be configured in the same computer or may respectively be configured in separate computers.

Also, in Embodiment 1, the client 500 also inputs, in addition to an execution target transaction, information (hereinafter, referred to as "lock demand information") clearly indicating whether or not the execution target transaction is a transaction that acquires a lock to operate, to the transaction processing apparatus 100.

Also, as shown in FIG. 2, in Embodiment 1, the data storage device 200 includes a KV pair access unit 201 that manages access to a KV pair and a KV pair storage unit 202. The KV pair storage unit 202 has stored therein a KV pair that is accessed by the transaction processing apparatus 100. The KV pair is pair data constituted by data (hereinafter, referred to also as "value") that is accessed by a transaction and a key (hereinafter, referred to also as "key value") that is associated therewith.

Upon accepting various access requests that will be described later from the transaction processing apparatus 100, the KV pair access unit 201 specifies KV pairs that have the key values specified by the accepted access requests, and subjects the specified KV pairs to read processing or write processing.

Also, as shown in FIG. 2, the transaction processing apparatus 100 includes the transaction analyzer 101, the lock manager 102, and the transaction executor 103, as has been shown in FIG. 1. Of them, the lock manager 102 further includes a lock information extractor 104 and a lock information writer 105.

Note that since the transaction processing apparatus 300 has the same configuration as that of the transaction processing apparatus 100, illustrations and descriptions of constituent components of the transaction processing apparatus 300 will be omitted.

As described above, the transaction analyzer 101 first analyzes the execution target transaction that is input from the client 500. Specifically, in Embodiment 1, the transaction analyzer 101 specifies one or more KV pairs that are to be accessed by the execution target transaction, and passes the key values of the specified KV pairs to the lock manager 102. The transaction analyzer 101 passes, in addition to the key values, the lock demand information that was input from the client 500 to the lock manager 102.

The lock manager 102 executes, with the lock information extractor 104 and the lock information writer 105, management of a lock that the execution target transaction acquires, that is, acquisition and writing of lock information, which will be described later.

Based on the key values passed from the transaction analyzer 101, the lock information extractor 104 acquires the KV pairs that correspond to the key values from the data storage device 200. Furthermore, the lock information extractor 104 checks whether or not in the KV pair storage unit 202, information (hereinafter, referred to as "lock information") indicating that each acquired KV pair is locked is present in an area (hereinafter, referred to as a "value portion") of the KV pair in which its value is stored. As a result of the check, if there is at least one KV pair in which lock information is present, the lock information extractor 104 will put the execution target transaction that was input from the client 500 into the stand-by state or will cause the execution target transaction to be aborted.

The lock information writer 105 acquires the information (lock demand information) that indicates whether or not the execution target transaction passed by the transaction analyzer 101 is a transaction that acquires a lock to operate. Then, the lock information writer 105 determines, based on the acquired lock demand information, whether or not the execution target transaction is a transaction that acquires a lock to operate.

Then, if the execution target transaction is a transaction that acquires a lock to operate, the lock information writer 105 causes the execution target transaction to acquire a lock. Specifically, the lock information writer 105 embeds the lock information in the value portion of the KV pair acquired by the lock information extractor 104, and writes the KV pair in which the lock information is embedded into the KV pair storage unit 202 of the data storage device 200.

According to Embodiment 1, the lock information that is stored in the value portion of the KV pair is not particularly limited, and any information may be stored as long as it can uniquely specify a transaction that is to acquire a lock. Examples of the lock information include information that includes the transaction number assigned uniquely to each of transactions that is to acquire a lock (see FIG. 4 described later). Furthermore, if a given-sized area at the head of the value portion is set as the area in which the lock information is stored, the above-described lock information extractor 104 can determine whether or not lock information is present in an acquired KV pair only by checking, upon acquisition of the KV pair, the set area at the head of its value portion.

Note that Embodiment 1 is not limited only to the form in which the lock information is embedded in a value portion. In Embodiment 1, the lock information may be embedded in an area other than the value portion, for example, an area (hereinafter, referred to as a "key portion") of a KV pair in which its key value is stored.

When the lock information writer 105 has embedded the lock information in the value portion of the acquired KV pair and has written this KV pair into the KV pair storage unit 202, the lock manager 102 requests the transaction executor 103 to execute the execution target transaction.

Furthermore, if the execution target transaction input from the client 500 is not a transaction that acquires a lock to operate, the lock information writer 105 does not embed the lock information in the value portion of the KV pair acquired by the lock information extractor 104. In this case, instead of performing embedding processing, the lock information writer 105 requests the transaction executor 103 to execute the execution target transaction.

Furthermore, when the execution target transaction acquired a lock and operated, the lock information writer 105 deletes, after the completion of the transaction processing by the transaction executor 103, the lock information of the value portion of the KV pair with respect to which the processing was executed. Then, the lock information writer 105 updates, using the KV pair from which the lock information was deleted, the KV pair stored in the KV pair storage unit 202 of the data storage device 200.

Note that in Embodiment 1, the lock information writer 105 employs the optimistic exclusive control method as an exclusive control method, and executes writing (updating) of a KV pair into the KV pair storage unit of the data storage device 200 according to this control method.

In Embodiment 1, upon a transaction execution request from the lock manager 102, the transaction executor 103 executes processing of an execution target transaction according to the optimistic exclusive control method. In order to reflect the processing result, the transaction executor 103 also updates, after the execution of the transaction, the value of the KV pair stored in the KV pair storage unit 202 of the data storage device 200 using the key value of the KV pair. Furthermore, when the execution of the execution target transaction has been completed, the transaction executor 103 notifies the lock manager 102 of the completion of the execution target transaction.

The lock manager 102 acquires in advance a KV pair that is to be accessed by an execution target transaction from the data storage device 200. Therefore, when requesting the transaction executor 103 to execute an execution target transaction, the lock manager 102 passes, to the transaction executor 103, information on the KV pair that is to be accessed by the execution target transaction together. This transaction processing eliminates the acquisition by the transaction executor 103 again of the KV pair from the data storage device 200 at the time of the execution of the transaction.

[Apparatus Operation]

Figure 3:
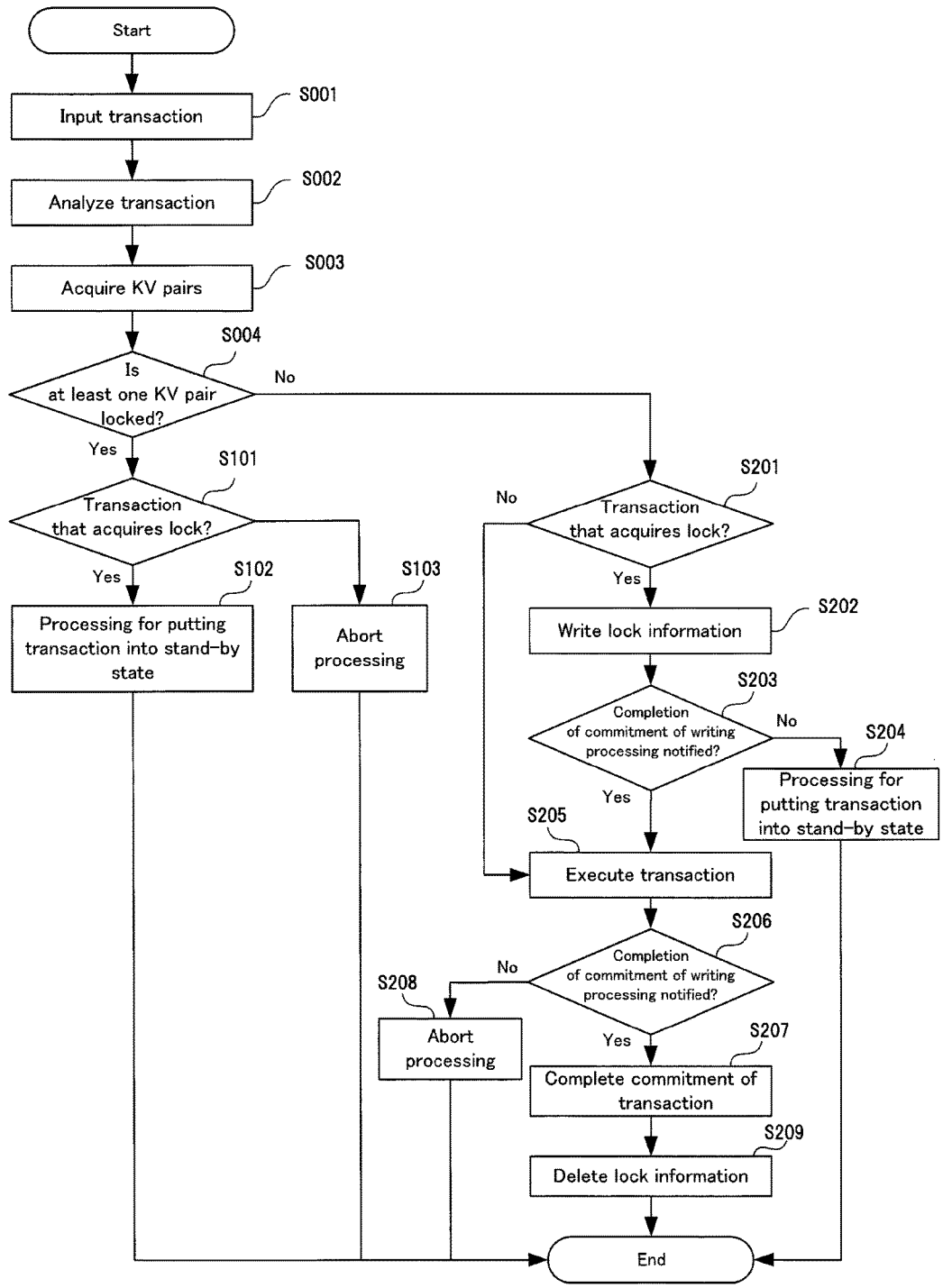
FIG. 3 is a flowchart illustrating the operation of the transaction processing apparatus according to Embodiment 1.

Hereinafter, the operation of the transaction processing apparatus 100 of Embodiment 1 will be described with reference to FIG. 3. FIG. 3 is a flowchart illustrating the operation of the transaction processing apparatus according to Embodiment 1. In the description below, FIGS. 1 and 2 are appropriately referenced. Furthermore, in Embodiment 1, a transaction processing method is executed by the transaction processing apparatus 100 operating. Accordingly, a description of the transaction processing method of Embodiment 1 is replaced by the below description of the operation of the transaction processing apparatus 100.

First, it is premised that the client 500 inputs an execution target transaction to the transaction processing apparatus 100. At that time, the client 500 inputs, in addition to the execution target transaction, lock demand information.

As shown in FIG. 3, when the execution target transaction and the lock demand information are input, the transaction processing apparatus 100 accepts the transaction and the lock demand information input from the client 500 (step S001).

Then, the transaction analyzer 101 analyzes the input execution target transaction, and specifies one or more KV pairs that are to be accessed by the execution target transaction (step S002). Furthermore, in step S002, the transaction analyzer 101 inputs the key values of the specified KV pairs and the lock demand information of the execution target transaction to the lock manager 102.

Then, the lock information extractor 104 of the lock manager 102 requests, based on the key values input from the transaction analyzer 101, the KV pair access unit 201 of the data storage device 200 to acquire the KV pairs (step S003). Accordingly, the KV pair access unit 201 acquires, from the KV pair storage unit 202, the KV pairs having the key values input from the lock information extractor 104. Furthermore, the KV pair access unit 201 returns the acquired KV pairs to the lock information extractor 104.

Then, the lock information extractor 104 determines whether or not at least one of the KV pairs acquired in step S003 is locked, that is, whether or not lock information is present in the value portions of the respective KV pairs acquired in step S003 (step S004).

For example, assume that a given-sized area at the head of the value portion of a KV pair is set as the area in which lock information is stored. Such an area is a 32-byte area at the head of the value portion, or the like. In this case, in step S004, the lock information extractor 104 can determine, after having acquired a KV pair, whether or not the acquired KV pair is locked by another transaction by checking the set area of the value portion thereof.

Figure 4:
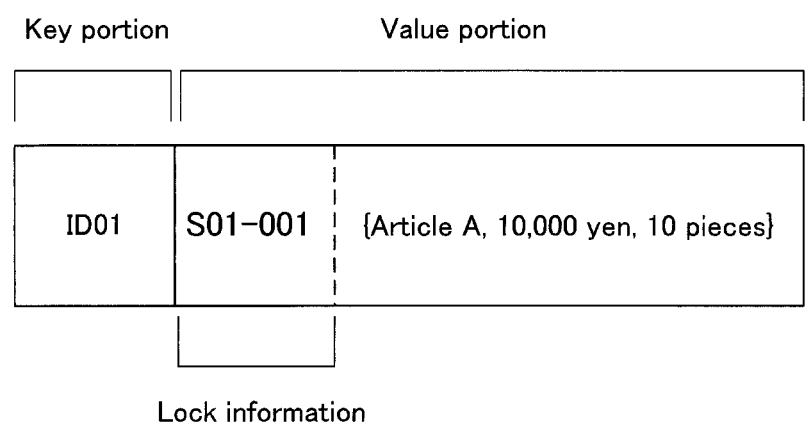
FIG. 4 is a diagram illustrating an example of a KV pair for use in Embodiment 1.

The following will describe a specific example of a KV pair in which lock information is embedded with reference to FIG. 4. FIG. 4 is a diagram illustrating an example of a KV pair for use in Embodiment 1. In the example of FIG. 4, the head of the value portion of the KV pair is used as the area in which lock information is stored. Furthermore, in the example of FIG. 4, the transaction number that uniquely indicates a transaction is used as the lock information, in order to indicate which transaction locks this KV pair.

Furthermore, the transaction number is not particularly limited and any transaction number may be used as long as it can uniquely specify a transaction. Examples of the transaction number include a combination of a server name of a server that processes the transaction and the number uniquely added to a transaction accepted by each server. Furthermore, when the KV pair is not locked, information indicating that the KV pair is not locked, instead of the lock information, is embedded. Examples of the information indicating that the KV pair is not locked include "0 (zero)".

Then, if the result of the above-described determination of step S004 shows that lock information is present in any or all of the KV pairs, the lock information extractor 104 determines whether or not the execution target transaction is a transaction that acquires a lock to operate (step S101).

If the result of the determination of step S101 shows that the execution target transaction is a transaction that acquires a lock to operate, the lock information extractor 104 performs processing for putting the execution target transaction into the execution stand-by state (step S102).

Specifically, in step S102, the lock information extractor 104 stores the transaction number of the execution target transaction and the key values of the KV pairs that are to be accessed by the execution target transaction, in a queue held by the lock manager 102. The transaction stored in the queue is re-executed at a fixed interval. Note that in the present specification, information that is stored in the queue is hereinafter referred to as "transaction information" for convenience.

On the other hand, if the result of the determination in step S101 shows that the execution target transaction is not a transaction that acquires a lock to operate, the lock information extractor 104 aborts the execution target transaction and returns an error due to an exclusion violation to the client 500 (step S103)

At that time, in Embodiment 1, the transaction processing apparatus 100 may notify the client 500 of the occurrence of the exclusion violation that is caused by another transaction that has acquired the lock being in progress. If the other transaction that has acquired the lock is in progress, immediate re-execution is likely to fail, and thus by notifying the client 500 of an error reason for the exclusion violation in this way, it is possible for the client 500 to determine to delay the re-execution of the transaction. Furthermore, Embodiment 1 may be configured such that when the execution target transaction is aborted, the error is not immediately returned to the client 500 but the processing is retried predetermined number of times.

Even if the result of the above-described determination in step S004 shows that lock information is not present in any of the KV pairs, the lock information extractor 104 determines, as with in step S101, whether or not the execution target transaction is a transaction that acquires a lock to operate (step S201).

If the result of the determination in step S201 shows that the execution target transaction is a transaction that acquires a lock to operate, the lock information writer 105 embeds the lock information in the value portion of the KV pair acquired in step S003 (step S202). Then, the lock information writer 105 requests the KV pair access unit 201 to write the KV pair in which the lock information is embedded.

Then, when step S202 is executed, and the lock information writer 105 performs requesting to write the KV pair, the KV pair access unit 201 of the data storage device 200 determines whether or not an exclusion violation occurs at the time of writing of the KV pair. If the result of the determination shows that there is no exclusion violation, the KV pair access unit 201 writes the KV pair in which the lock information is embedded into the KV pair storage unit 202, and then notifies the lock information writer 105 of the completion of the commitment of the writing processing. On the other hand, if the result of the determination shows that there is an exclusion violation, the KV pair access unit 201 notifies the lock information writer 105 of that fact.

Therefore, after the execution of step S202, the lock information writer 105 determines whether or not the completion of the commitment of the writing processing has been notified by the KV pair access unit 201 (step S203).

If the result of the determination in step S203 shows that the completion of the commitment has not been notified by the KV pair access unit 201, the lock manager 102 performs processing for putting that transaction into the execution stand-by state (step S204). Note that the processing that is executed in step S204 is similar to the processing in step S102, and thus a detailed description thereof is omitted.

On the other hand, if the result of the determination of step S203 shows that the completion of the commitment has been notified by the KV pair access unit 201, the lock information writer 105 requests the transaction executor 103 to execute processing of the execution target transaction (step S205). Accordingly, the transaction executor 103 executes the processing of the execution target transaction, and requests the KV pair access unit 201 to write the KV pair in order to reflect the processing result.

At that time, as with after the execution of step S202, the KV pair access unit 201 of the data storage device 200 determines whether or not an exclusion violation occurs at the time of writing the KV pair. If the result of the determination shows that there is no exclusion violation, the KV pair access unit 201 writes the KV pair in which the lock information is embedded into the KV pair storage unit 202, and then notifies the transaction executor 103 of the completion of the commitment of the writing processing. On the other hand, if the result of the determination shows that there is an exclusion violation, the KV pair access unit 201 notifies the transaction executor 103 of that fact.

Accordingly, after the execution of step S205, the transaction executor 103 determines whether or not the completion of the commitment of the writing processing has been notified by the KV pair access unit 201 (step S206).

If the result of the determination of step S206 shows that the completion of the commitment has not been notified by the KV pair access unit 201, the transaction executor 103 aborts the execution target transaction, and returns an error due to the exclusion violation to the client 500 (step S208). Furthermore, in step S208, the transaction executor 103 may retry the processing predetermined number of times, instead of immediately returning the error to the client 500.

Note that in the transaction processing apparatus 100, after an execution target transaction has acquired the lock, another transaction that is to be executed in the other transaction processing apparatus 300 is put into the stand-by state in step S102 or aborted in step S103. Therefore, the execution target transaction, after having acquired the lock, does not fail due to an exclusion violation.

On the other hand, if the result of the determination in step S206 shows that the completion of the commitment has been notified by the KV pair access unit 201, the transaction executor 103 notifies the lock information writer 105 of the completion of the commitment of the transaction since the writing of the KV pair is completed (step S207).

Then, when step S207 is executed, the lock information writer 105 deletes, from the KV pair in which this lock information is written, the lock information at the time of execution of the execution target transaction (step S209). Furthermore, the lock information writer 109 requests the KV pair access unit 201 to write the KV pair from which the lock information was deleted.

Furthermore, in the data storage device 200, the KV pair access unit 201 writes, upon receiving a request, the KV pair from which the lock information was deleted into the KV pair storage unit 202. Furthermore, since this writing processing is executed in the situation in which the lock has been acquired, no exclusion violation against another transaction occurs.

Furthermore, the wording "deletion of lock information" refers, for example, to a case where information, such as "0 (zero)" indicating that locking is not made is embedded in the value portion in which the lock information is stored. Furthermore, the deletion of lock information may be executed at the time of the KV pair writing by the transaction executor 103, in step S205 of executing the transaction.

Furthermore, if the result of the above-described determination of step S201 shows that the execution target transaction is not a transaction that acquires a lock to operate, step S205 described above will be executed. Specifically in this case, the lock information extractor 104 requests the transaction executor 103 to execute processing of the execution target transaction. Accordingly, the transaction executor 103 executes the processing of the execution target transaction, and requests the KV pair access unit 201 to write the KV pair in order to reflect the processing result.

Furthermore, in the case of a transaction that does not acquire a lock to operate, an exclusion violation may occur when the KV pair access unit 201 performs writing into the KV pair storage unit 202. Therefore, also in this case, in the data storage device 200, the KV pair access unit 201 determines whether or not an exclusion violation occurs at the time of writing of the KV pair.

Then, step S206 described above is executed, and then step S207 or step S208 described above is executed. Note that since, in this case, the execution target transaction is not a transaction that acquires a lock to operate, step S209 of deleting the lock information is not executed.

SPECIFIC EXAMPLES OF EXCLUSION VIOLATION

The following will describe specific examples of the exclusion violation that is determined by the data storage device 200 at the time of execution of the steps shown in FIG. 3 with reference to FIGS. 5 to 8.

Specific Example 1

Figure 5:
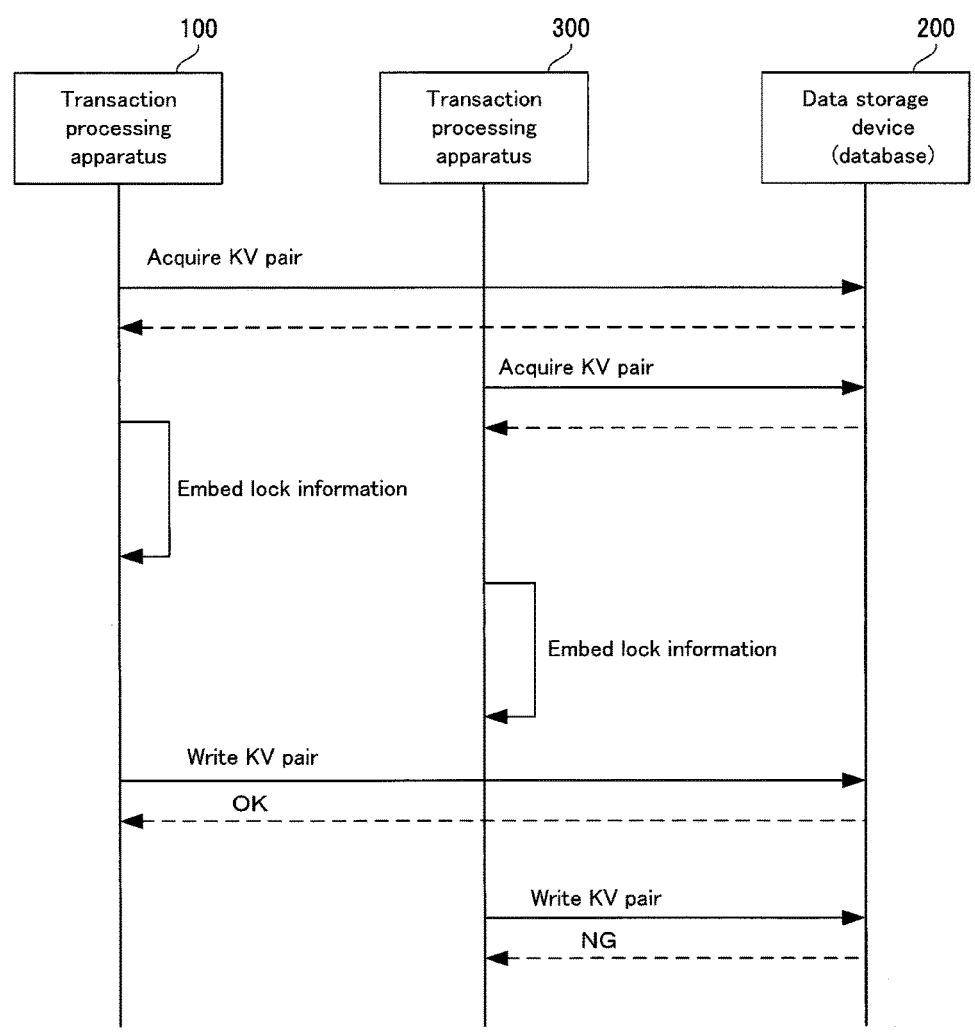
FIG. 5 is a diagram illustrating an example of an exclusion violation that is determined after the execution of step S202 shown in FIG. 3.
Figure 6:
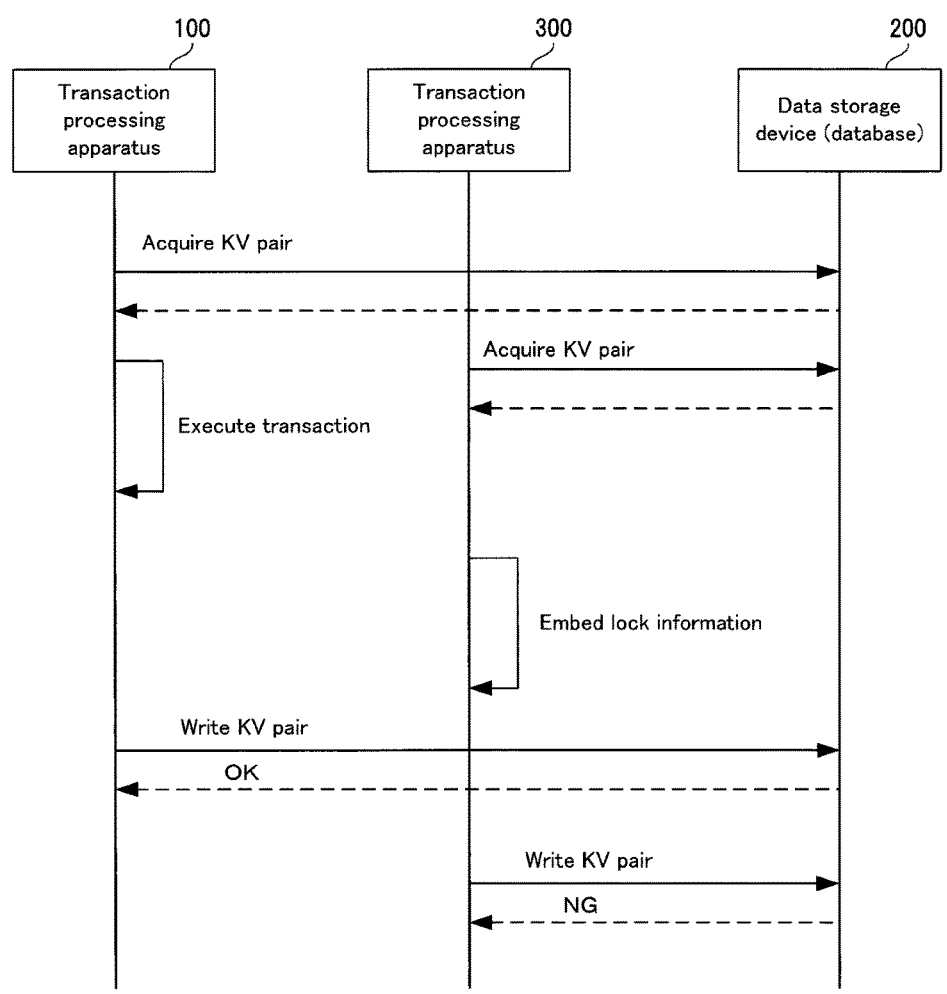
FIG. 6 is a diagram illustrating another example of the exclusion violation that is determined after the execution of step S202 shown in FIG. 3.

First, an exclusion violation that is determined by the KV pair access unit 201 after the execution of step S202 shown in FIG. 3 will be described. Two cases of the exclusion violation are here conceivable. The respective cases will be described with reference to FIGS. 5 and 6. FIG. 5 is a diagram illustrating an example of the exclusion violation that is determined after the execution of step S202 shown in FIG. 3. FIG. 6 is a diagram illustrating another example of the exclusion violation that is determined after execution of step S202 shown in FIG. 3.

First, FIG. 5 shows the case where an exclusion violation occurs when transactions that acquire a lock to operate embed lock information in a KV pair so as to acquire a lock, and write the KV pair into the KV pair storage unit 202.

In the example of FIG. 5, both the transaction that is executed by the transaction processing apparatus 100 and the transaction that is executed by the transaction processing apparatus 300 are transactions that acquire a lock to operate.

Accordingly, as shown in FIG. 5, both the transaction processing apparatus 100 and the transaction processing apparatus 300 first execute acquisition of a KV pair. This processing corresponds to step S003 shown in FIG. 3. Note that in step S004 that is executed thereafter, each of the transaction processing apparatuses is assumed to determine that no lock information is present in the acquired KV pair (No determination).

Then, in both the transaction processing apparatus 100 and the transaction processing apparatus 300, the lock information writers 105 embed lock information in the value portion of the KV pair. Furthermore, the lock information writers 105 request the KV pair access unit 201 of the data storage device 200 to write the KV pairs in which the lock information is embedded. This processing corresponds to step S202 shown in FIG. 3.

Then, in the data storage device 200, the writing of the KV pair is executed in accordance with the optimistic exclusive control method. Therefore, as shown in FIG. 5, if the transaction processing apparatus 100 first executes writing of the KV pair, lock acquisition by the transaction processing apparatus 100 will be successful, but lock acquisition by the transaction processing apparatus 300 will fail due to the exclusion violation.

Then, the second case will be described. FIG. 6 shows the case where a transaction that does not acquire a lock to operate and a transaction that acquires a lock to operate cause an exclusion violation.

In the example of FIG. 6, the transaction that is executed by the transaction processing apparatus 100 is a transaction that does not acquire a lock to operate, but the transaction that is executed by the transaction processing apparatus 300 is a transaction that acquires a lock to operate.

Therefore, as shown in FIG. 6, both the transaction processing apparatus 100 and the transaction processing apparatus 300 first execute acquisition of a KV pair. This processing corresponds to step S003 shown in FIG. 4. Note that also in the example of FIG. 6, each of the transaction processing apparatuses is assumed to determine that no lock information is present in the acquired KV pair (No determination).

Then, in the transaction processing apparatus 100, after the KV pair has been acquired, the transaction executor 103 executes the transaction and requests the KV pair access unit 201 of the data storage device 200 to write the KV pair that was subjected to the transaction processing. This processing corresponds to step S205 shown in FIG. 3.

On the other hand, in the transaction processing apparatus 300, after the KV pair has been acquired, the lock information writer 105 embeds lock information in the value portion of the KV pair, and requests the KV pair access unit 201 of the data storage device 200 to write the KV pair in which the lock information is embedded. This processing corresponds to step S202 shown in FIG. 3.

Then, in the data storage device 200, the writing the KV pair is executed in accordance with the optimistic exclusive control method. Therefore, as shown in FIG. 6, similarly to the example of FIG. 5, if the transaction processing apparatus 100 first executes writing of the KV pair, execution of the transaction by the transaction processing apparatus 100 will be successful, but lock acquisition by the transaction processing apparatus 300 will fail due to the exclusion violation.

Specific Example 2

Figure 7:
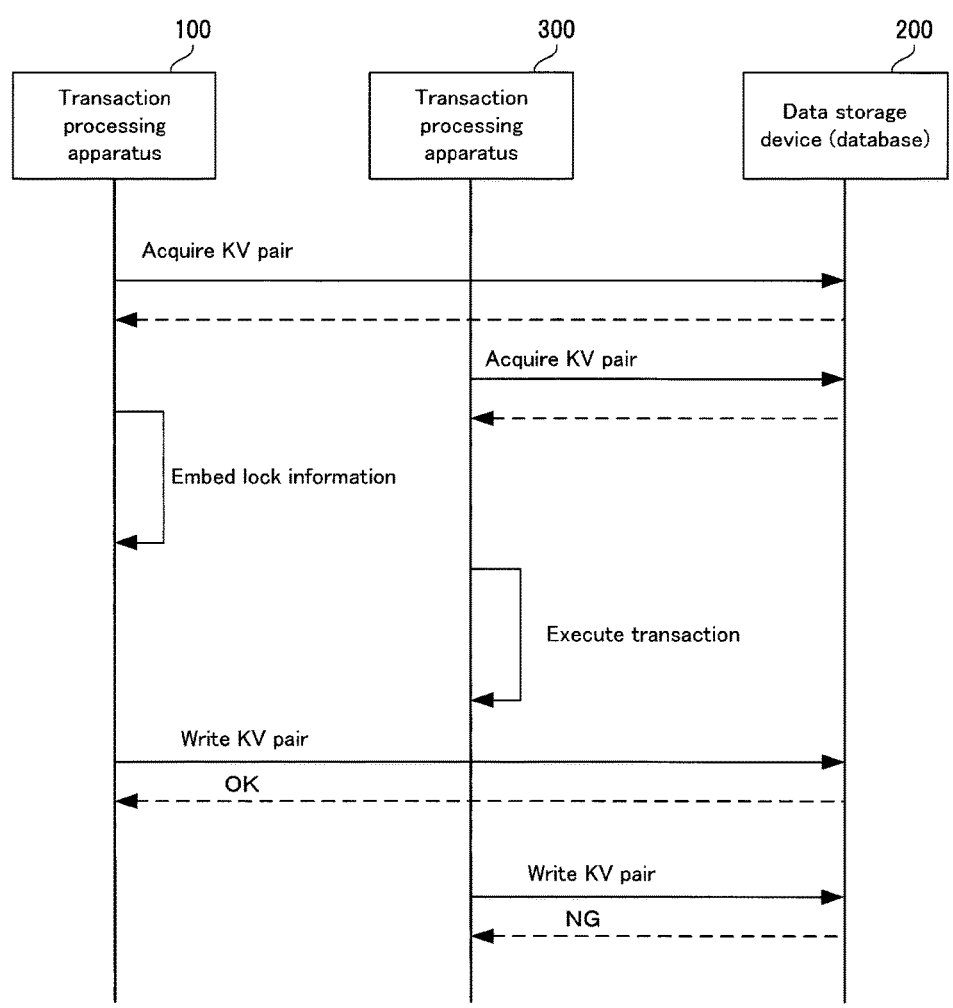
FIG. 7 is a diagram illustrating an example of an exclusion violation that is determined after the execution of step S205 shown in FIG. 3.
Figure 8:
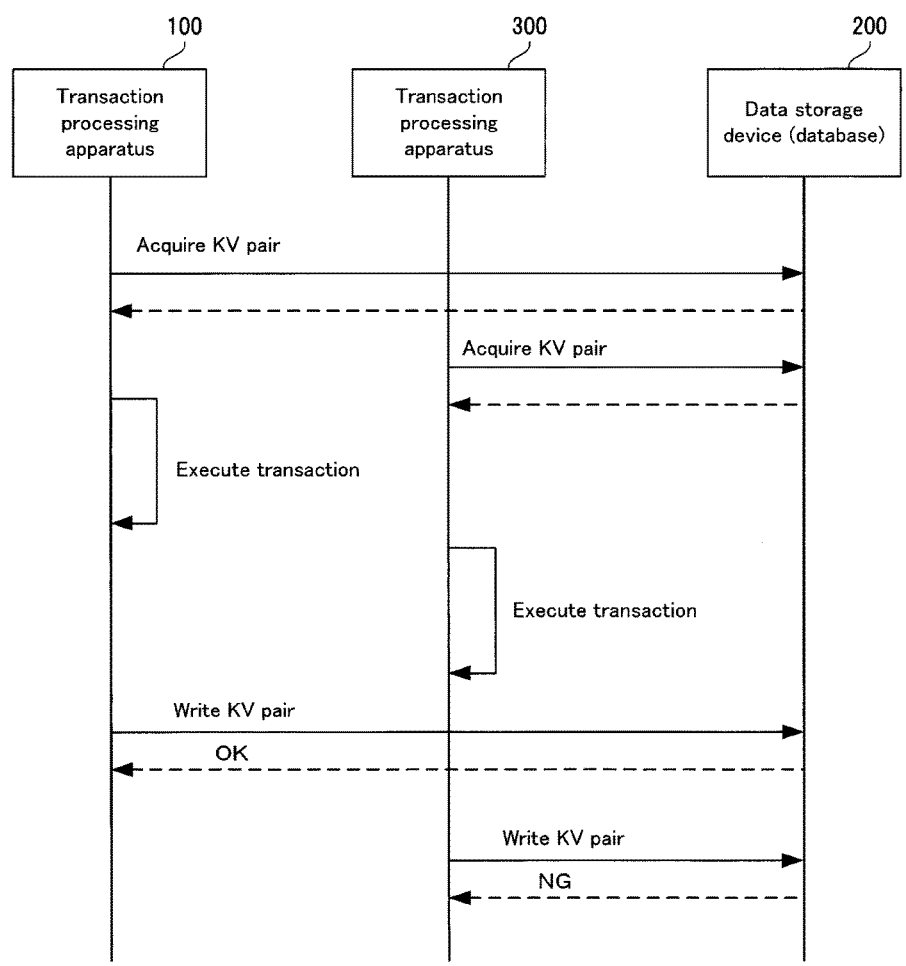
FIG. 8 is a diagram illustrating another example of the exclusion violation that is determined after the execution of step S205 shown in FIG. 3.

The following will describe an exclusion violation that is determined by the KV pair access unit 201 after the execution of step S205 shown in FIG. 3. Two cases of the exclusion violation are also here conceivable. The respective cases will be described with reference to FIGS. 7 and 8. FIG. 7 is a diagram illustrating an example of the exclusion violation that is determined after execution of step S205 shown in FIG. 3. FIG. 8 is a diagram illustrating another example of the exclusion violation that is determined after execution of step S205 shown in FIG. 3.

First, FIG. 7 shows the case where a transaction that acquires a lock to operate and a transaction that does not acquire a lock to operate cause an exclusion violation.

In the example of FIG. 7, the transaction that is executed by the transaction processing apparatus 100 is a transaction that acquires a lock to operate, but the transaction that is executed by the transaction processing apparatus 300 is a transaction that does not acquire a lock to operate.

As shown in FIG. 7, both the transaction processing apparatus 100 and the transaction processing apparatus 300 first execute acquisition of a KV pair. This processing corresponds to step S003 shown in FIG. 3. Note that in the example of FIG. 7, in step S004 that is executed thereafter, each of the transaction processing apparatuses is assumed to determine that no lock information is present in the acquired KV pair (No determination) since step S205 will be executed.

Then, in the transaction processing apparatus 100, after the KV pair has been acquired, the lock information writer 105 embeds lock information in the value portion of the KV pair. Furthermore, the lock information writer 105 requests the KV pair access unit 201 of the data storage device 200 to write the KV pair in which the lock information is embedded. This processing corresponds to step S202 shown in FIG. 3.

On the other hand, in the transaction processing apparatus 300, after the KV pair has been acquired, the transaction executor 103 executes the transaction and requests the KV pair access unit 201 of the data storage device 200 to write the KV pair subjected to the transaction processing. This processing corresponds to step S205 shown in FIG. 3.

Also, in the data storage device 200, the writing of the KV pair is executed in accordance with the optimistic exclusive control method. Therefore, as shown in FIG. 7, if the transaction processing apparatus 100 first executes writing of the KV pair, execution of the transaction by the transaction processing apparatus 100 will be successful, but lock acquisition by the transaction processing apparatus 300 will fail due to the exclusion violation.

Then, the second case will be described. FIG. 8 shows the case where transactions that do not acquire a lock to operate cause an exclusion violation.

In the example of FIG. 8, both the transaction that is executed by the transaction processing apparatus 100 and the transaction that is executed by the transaction processing apparatus 300 are transactions that do not acquire a lock to operate.

Therefore, as shown in FIG. 8, both the transaction processing apparatus 100 and the transaction processing apparatus 300 first execute acquisition of a KV pair. This processing corresponds to step S003 shown in FIG. 3. Note that in the example of FIG. 8, in step S004 that is executed thereafter, each of the transaction processing apparatuses is assumed to determine that no lock information is present in the acquired KV pair (No determination) since step S205 will be executed.

Then, in both the transaction processing apparatus 100 and the transaction processing apparatus 300, after the KV pair has been acquired, the transaction executors 103 execute the transactions, and request the KV pair access unit 201 of the data storage device 200 to write the KV pairs that were subjected to the transaction processing. This processing corresponds to step S205 shown in FIG. 3.

Also, in the data storage device 200, the writing of the KV pairs is executed in accordance with the optimistic exclusive control method. Therefore, as shown in FIG. 8, similarly to the example of FIG. 7, if the transaction processing apparatus 100 first executes writing of the KV pair, execution of the transaction by the transaction processing apparatus 100 will be successful, but lock acquisition by the transaction processing apparatus 300 will fail due to the exclusion violation.

[Transaction Re-Execution Processing]

Figure 9:
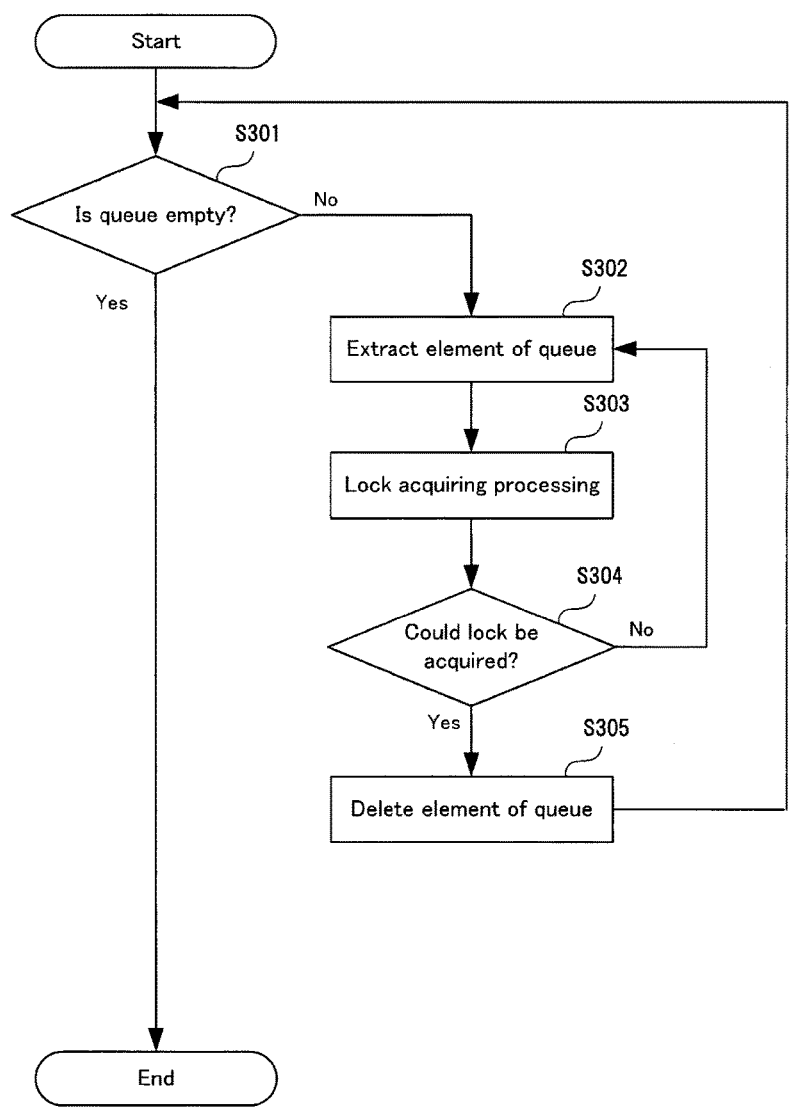
FIG. 9 is a flowchart illustrating the operation of transaction re-execution processing by the transaction processing apparatus according to Embodiment 1.

The following will describe processing for re-executing a transaction that is stored in the queue by the lock manager 102 in step S102 shown in FIG. 3 with reference to FIG. 9. FIG. 9 is a flowchart illustrating the operation of transaction re-execution processing that is performed by the transaction processing apparatus according to Embodiment 1.

As shown in FIG. 9, first, the lock information extractor 104 determines whether or not transaction information is stored in the queue held by itself (step S301). If the result of the determination of step S301 shows that no transaction information is stored in the queue, the lock information extractor 104 ends the procedure.

On the other hand, if the result of the determination of step S301 shows that transaction information is stored in the queue, the lock information extractor 104 extracts the transaction information, which is an element of the queue, stored in the head of the queue (step S302).

Then, the lock information extractor 104 performs processing for acquiring a lock with respect to the transaction information extracted in step S302 (step S303). This processing corresponds to lock acquiring processing shown in FIG. 3. Note that in this context, "lock acquiring processing" means the processing, shown in FIG. 3, from step S003 of acquiring a KV pair to step S102 of putting the transaction into the stand-by state, the processing from step S003 to step S204 of determining the completion of the commitment, or the processing from step S003 to step S205 of putting the transaction into the stand-by state.

Then, the lock information extractor 104 determines whether or not the lock that corresponds to the transaction information could be acquired in step S303 (step S304). If the result of the determination of step S304 shows that the lock could be acquired, the lock information extractor 104 deletes the extracted element from the queue (step S305). Then, step S301 is executed again.

On the other hand, if the result of the determination of step S304 shows that the lock could not be acquired, the processing returns again to step S302, where the lock information extractor 104 executes the same processing on the next transaction stored in the queue.

Furthermore, after the execution of step S305 of deleting the element of the queue, the lock information extractor 104 requests the transaction executor 103 to execute the transaction that corresponds to the element extracted in step S102 although the processing is not shown in FIG. 9. This processing corresponds to step S205 shown in FIG. 3.

Furthermore, if it is determined in step S301 that the transaction information is not stored in the queue, the processing ends, but the lock information extractor 104 executes again step S301 after the elapse of a set time period. In other words, the lock information extractor 104 re-executes a transaction stored in the queue at a fixed interval.

Meanwhile, assumed that during the time from unlocking of the KV pair that is to be accessed by an execution target transaction to the re-execution of the execution target transaction, a new transaction that accesses the KV pair that is to be accessed by the execution target transaction is input from the client 500. In this case, the new transaction will be processed first.

Therefore, if a new transaction that accesses the KV pair that is to be accessed by a transaction stored in the queue is input, the transaction stored in the queue is preferably executed first. Furthermore, at that time, the new transaction is assumed to be a transaction that acquires a lock to operate. In this case, the transaction number of the new transaction and the key value that is to be accessed by the new transaction are stored at the end of the queue. On the other hand, if the new transaction is not a transaction that acquires a lock to operate, the processing will be aborted and an error due to an exclusion violation will be returned to the client 500.

[Program]

A program according to Embodiment 1 may be a program that causes a computer to execute steps S001 to S209 shown in FIG. 3 as well as steps S301 to S305 shown in FIG. 9. By installing this program in the computer and executing it, it is possible to realize the transaction processing apparatus and the transaction processing method of Embodiment 1. In this case, a CPU (Central Processing Unit) of the computer functions as the transaction analyzer 101, the lock manager 102, and the transaction executor 103, and performs the processing.

Effects of Embodiment 1

As described above, according to Embodiment 1, in a distributed KVS in which exclusive control is performed in accordance with the optimistic exclusive control method, by writing lock information into the KV pair that is to be accessed by a transaction that serves as an execution target, it is possible to cause the transaction to acquire a lock. In this case, even if another transaction that accesses the same KV pair is present, it is possible to exclude the other transaction by putting it into the stand-by state or aborting it.

As a result, the disadvantage caused when an optimistic exclusive control method is employed is addressed, that is, the disadvantage that when the update frequency with respect to a specific KV pair is high, transactions compete against each other, and the number of retries of a transaction that has failed to be committed increases, leading to an increase in overhead.

Furthermore, if an optimistic exclusive control method is employed, there is the disadvantage that at the time of executing a long transaction, the commitment of this transaction will never become successful due to the competition with a transaction, but the disadvantage can be addressed by Embodiment 1. Accordingly, the design of an application is simplified.

Furthermore, since locking is performed based on data embedded in the value portion of a KV pair in contrast to the case where a pessimistic exclusive control method is employed, the disadvantage that the scalability is reduced with the lock management serving as a bottleneck is addressed.

Embodiment 2

Hereinafter, a transaction processing apparatus, a transaction processing method, and a program according to Embodiment 2 will be described with reference to FIGS. 10 to 12.

First, a configuration of the transaction processing apparatus according to Embodiment 2 will be described with reference to FIGS. 10 and 11. FIG. 10 is a block diagram illustrating a specific configuration of the transaction processing apparatus according to Embodiment 2.

Figure 10:
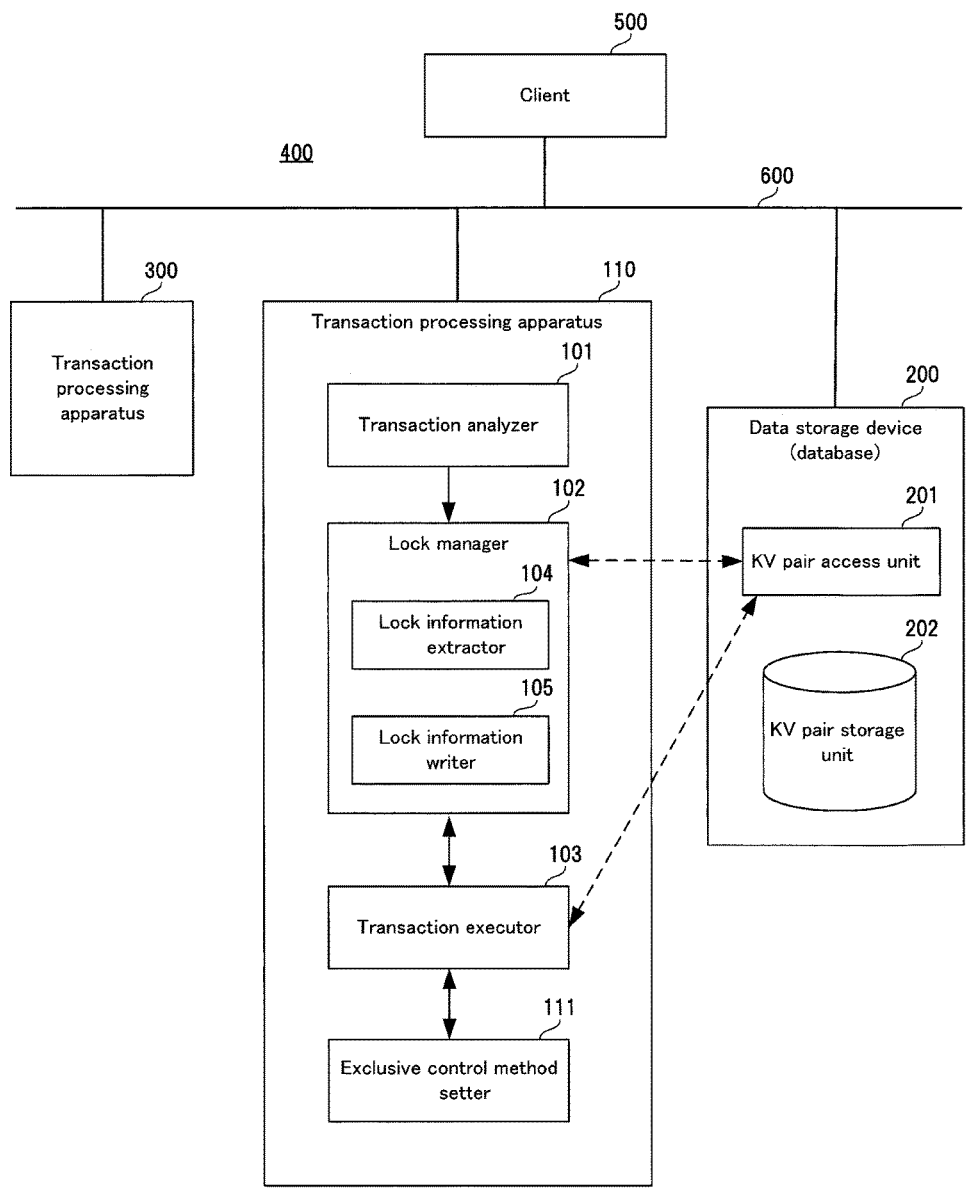
FIG. 10 is a block diagram illustrating a specific configuration of a transaction processing apparatus according to Embodiment 2.

As shown in FIG. 10, the transaction processing apparatus 110 of Embodiment 2 includes the transaction analyzer 101, the lock manager 102, the transaction executor 103, and an exclusive control method setter 111.

That is, the transaction processing apparatus 110 differs from the transaction processing apparatus 100 in that the transaction processing apparatus 110 includes the exclusive control method setter 111, in addition to the configuration of the transaction processing apparatus 100 of Embodiment 1 that is shown in FIG. 2. Hereinafter, the differences from Embodiment 1 will mainly be described.

The exclusive control method setter 111 sets, as the exclusive control method for use when the execution target transaction is executed, either a first exclusive control method (optimistic exclusive control method), which is not to acquire a lock, or a second exclusive control method (pessimistic exclusive control method), which is to acquire a lock. For example, when the optimistic exclusive control method is set, the exclusive control method setter 111 sets the pessimistic exclusive control method instead of the optimistic exclusive control method, on the condition that the execution of the execution target transaction is not completed and the set condition is satisfied. In this case, the transaction executor 103 executes the execution target transaction in accordance with the set exclusive control method.

Specifically, first, in Embodiment 2, if an execution target transaction that operates without acquiring a lock and was input from the client 500 has failed due to an exclusion violation, the transaction executor 103 will retry the processing predetermined number of times. Then, the exclusive control method setter 111 records, when the execution target transaction that operates without acquiring a lock has failed due to an exclusion violation, the number of retries of the execution target transaction that were performed and an average execution time period thereof.

Then, based on the information on the number of retries and the average execution time period, the exclusive control method setter 111 changes the exclusive control method for the execution target transaction to the pessimistic exclusive control method, which is to acquire a lock, and requests the transaction executor 103 to perform re-execution. Hereinafter, changing the exclusive control method based on information on the number of retries and an average execution time period will be described with reference to FIG. 10.

FIG. 11 is a diagram illustrating an example of the information on the numbers of retries and average execution time periods that are managed in Embodiment 2. As shown in FIG. 11, the exclusive control method setter 111 manages the numbers of retries and average execution time period of transactions. Furthermore, in the example of FIG. 11, the number of retries and the average execution time period are recorded for each transaction number of the transactions.

Also, in Embodiment 2, in order for an average execution time period of a transaction to be managed by the exclusive control method setter 111, the transaction executor 103 records execution time periods of the executed transaction. Then, if the execution of the transaction has failed due to an exclusion violation, the transaction executor 103 notifies the exclusive control method setter 111 of the transaction number and the execution time period.

When having been notified of the transaction number and the execution time period by the transaction executor 103, the exclusive control method setter 111 updates the information managed by itself. Specifically, if the same transaction number as the number notified by the transaction executor 103 is included in the information managed by the exclusive control method setter 111, the exclusive control method setter 111 increments the number of retries that is associated with the corresponding transaction number by 1, and recalculates the average execution time period.

On the other hand, if the same number as the transaction number notified by the transaction executor 103 is not included in the information that is managed by the exclusive control method setter 111, the exclusive control method setter 111 newly records the information, namely, 1 as the number of retries and the execution time period notified by the transaction executor 103 as the average execution time period.

The exclusive control method setter 111 updates the information that corresponds to the transaction number notified by the transaction executor 103 in this manner. Then, the exclusive control method setter 111 determines, based on the updated information, that is, the updated number of retries and average execution time period, whether to leave the transaction that does not acquire a lock to operate unchanged and retry it, or to change the transaction that does not acquire a lock to operate to the transaction that acquires a lock to operate and retry it.

For example, the exclusive control method setter 111 can change the exclusive control method if both the number of retries and the average execution time period are predetermined values or greater. Specifically, the exclusive control method setter 111 may change the exclusive control method, if the number of retries exceeds 10 times and the average execution time period exceeds 1000 milliseconds. Alternatively, the exclusive control method setter 111 may change the exclusive control method, if the number of retries is a predetermined number of times or greater or if the average execution time period is a predetermined time or greater. Alternatively, the exclusive control method setter 111 may change the exclusive control method if an evaluation value calculated based on the number of retries and the average execution time period is a predetermined value or greater.

Furthermore, as described above, in Embodiment 2, parameters for use in changing the exclusive control method include the number of retries and an average execution time period, and the reason thereof is as follows. First, an increase in the number of retries means that the transaction has failed frequently due to exclusion violations. Therefore, it can be determined that the transaction that acquires a lock to operate is preferably executed if the number of retries is great. Furthermore, if the number of retries is not great but the execution time period of the transaction is long, the transaction is likely to fail due to an exclusion violation also in the future, and thus it is possible to determine that the transaction that acquires a lock to operate is preferably executed. In view of this point of view, the number of retries and an average execution time period are used as the parameters.

[Apparatus Operation]

Hereinafter, the operation of the transaction processing apparatus 110 of Embodiment 2 will be described with reference to FIG. 12. Note that in Embodiment 2, the same processing as that of Embodiment 1 excluding the processing by the exclusive control method setter 111 is performed. In other words, also in Embodiment 2, steps S001 to S209 that are shown in FIG. 3 and steps S301 to S305 that are shown in FIG. 9 are executed, as with in Embodiment 1. Accordingly, in the following, the operation of the exclusive control method setter 111 will mainly be described.

Furthermore, in the following description, FIGS. 10 and 11 are appropriately referenced. Also, in Embodiment 2, a transaction processing method is executed by the transaction processing apparatus 110 operating. Accordingly, the description of the transaction processing method in Embodiment 2 is replaced by the below description of the operation of the transaction processing apparatus 110.

Figure 12:
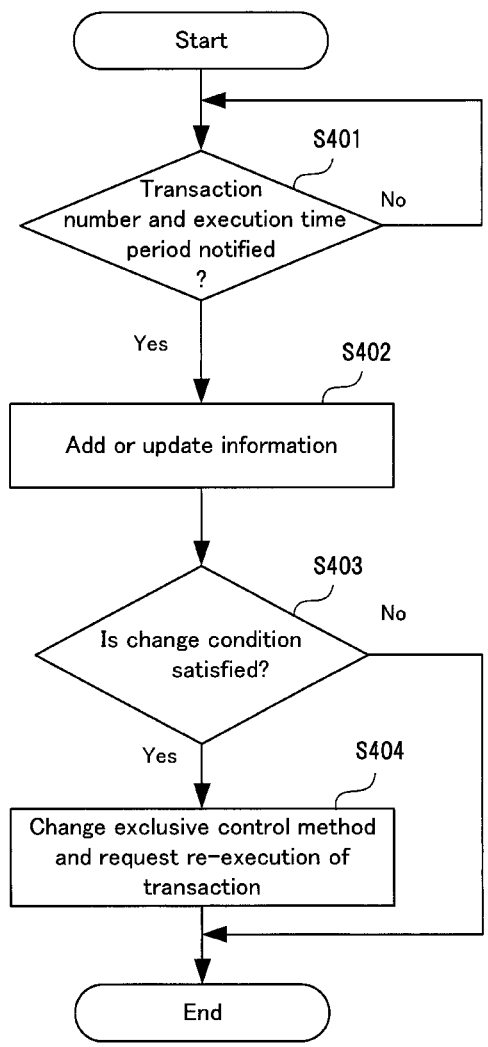
FIG. 12 is a flowchart illustrating the operation of exclusive control method setting processing by the transaction processing apparatus according to Embodiment 2.

FIG. 12 is a flowchart illustrating the operation of exclusive control method setting processing of the transaction processing apparatus according to Embodiment 2. As shown in FIG. 12, first, the exclusive control method setter 111 determines whether or not a transaction number and an execution time period have been notified by the transaction executor 103 (step S401).

If the result of the determination of step S401 shows that a transaction number and an execution time period have not been notified, the exclusive control method setter 111 is in a stand-by state. On the other hand, if the result of the determination of step S401 shows that a transaction number and an execution time period have been notified, the exclusive control method setter 111 adds information that is to be managed, or updates the managed information (step S402).

Specifically, if, in step S402, the same number as the notified transaction number is included in the managed information, the exclusive control method setter 111 increments the number of retries that is associated with the corresponding transaction number by 1, and recalculates the average execution time period. On the other hand, if the same number as the transaction number is not included in the managed information, the exclusive control method setter 111 newly records the information, namely, 1 as the number of retries and the notified execution time period as the average execution time period.

Then, the exclusive control method setter 111 determines, based on the updated information, whether or not a change condition of the exclusive control method for an execution target transaction is satisfied (step S403). Specifically, the exclusive control method setter 111 determines whether or not both the number of retries and the average execution time period are predetermined values or greater.

If the result of the determination of step S403 shows that the change condition is not satisfied, the exclusive control method setter 111 ends the processing. On the other hand, if the result of the determination of step S403 shows that the change condition is satisfied, the exclusive control method setter 111 changes the exclusive control method and requests the transaction executor 103 to perform re-execution (step S404), and then ends the processing. Furthermore, when a set time has elapsed after the end of the processing, the exclusive control method setter 111 executes again steps S401 to S404.

[Program]

A program according to Embodiment 2 may be a program that causes a computer to execute steps S001 to S209 that are shown in FIG. 3, steps S301 to S305 that are shown in FIG. 9, and steps S401 to S404 that are shown in FIG. 12. By installing this program in the computer and executing it, it is possible to realize the transaction processing apparatus and the transaction processing method of Embodiment 2. In this case, a CPU (Central Processing Unit) of the computer functions as the transaction analyzer 101, the lock manager 102, the transaction executor 103, and the exclusive control method setter 111, and performs the processing.

Effects of Embodiment 2

As described above, according to Embodiment 2, it is possible to change the transaction that is operating without acquiring a lock to the transaction that acquires a lock to operate, based on a setting condition. According to Embodiment 2, it is thus possible to reduce an overhead caused by retry of the transaction more efficiently.

Embodiment 3

Figure 13:
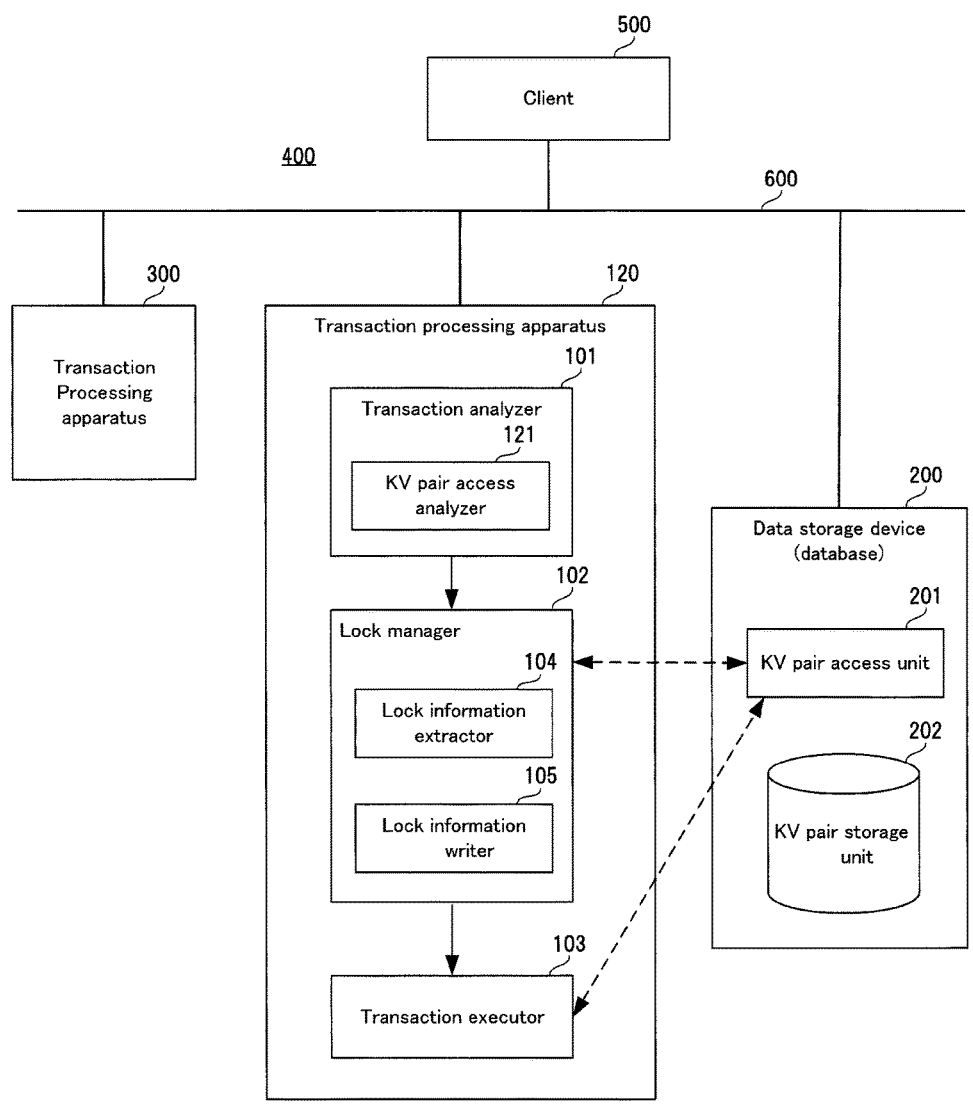
FIG. 13 is a block diagram illustrating a specific configuration of a transaction processing apparatus according to Embodiment 3.

Hereinafter, a transaction processing apparatus, a transaction processing method, and a program according to Embodiment 3 will be described with reference to FIG. 13. FIG. 13 is a block diagram illustrating a specific configuration of the transaction processing apparatus according to Embodiment 3.

As shown in FIG. 13, the transaction processing apparatus 120 of Embodiment 3 includes the transaction analyzer 101, the lock manager 102, and the transaction executor 103, similarly to the transaction processing apparatus 100 of Embodiment 1 shown in FIG. 2.

However, in Embodiment 3, the transaction processing apparatus 120 further includes a KV pair access analyzer 121 in the transaction analyzer 101, and differs from the transaction processing apparatus 100 of Embodiment 1 in this point. Hereinafter, the difference from Embodiment 1 will mainly be described.

In Embodiment 3, the transaction analyzer 101 has the function described in Embodiment 1, and further includes the KV pair access analyzer 121. The KV pair access analyzer 121 first specifies the number of pieces of data (KV pair) that is to be accessed by an execution target transaction. Also, depending on the number of the specified KV pairs, the KV pair access analyzer 121 sets, as the exclusive control method for use when the execution target transaction is executed, either an optimistic exclusive control method, which is not to acquire acquiring a lock, or a pessimistic exclusive control method, which is to acquire a lock.

Specifically, if the execution target transaction is a transaction that updates only one KV pair, the KV pair access analyzer 121 will select the optimistic exclusive control method as the exclusive control method for the transaction. On the other hand, if the execution target transaction is a transaction that updates two or more KV pairs, the KV pair access analyzer 121 will select the pessimistic exclusive control method.

The reason why, as described above, the optimistic exclusive control is selected if there is one KV pair that is to be updated, and the pessimistic exclusive control is selected if there are two or more KV pairs that are to be updated is as follows. That is, if there is one KV pair that is to be updated, a retry due to a competition with a transaction is less likely to occur. On the other hand, if there are two or more KV pairs that are to be updated, a retry due to a competition with a transaction is likely to occur. Therefore, in order to reduce the occurrence of the retry, the optimistic exclusive control is selected if there is one KV pair, and the pessimistic exclusive control is selected if there are two or more KV pairs.

Furthermore, the KV pair access analyzer 121 passes, in addition to the key value of the KV pair that is to be accessed by the execution target transaction and the lock demand information, information on the exclusive control method selected for the execution target transaction to the lock manager 102. Then, the lock manager 102 and the transaction executor 103 operate similarly to Embodiment 1.

As described above, in Embodiment 3, in step S002 shown in FIG. 3, setting of an exclusive control method and passing of information on the exclusive control method are additionally performed, but the remaining steps are the same as those of Embodiment 1. That is, in Embodiment 3, step S001, step S002 including the additional processing, and steps S003 to S209 that are shown in FIG. 3, and steps S301 to S305 shown in FIG. 9 are executed. Then, by executing these steps, the transaction processing method of Embodiment 3 is executed.

[Program]

A program according to Embodiment 3 may be a program that causes a computer to execute step S001, step S002 including the additional processing, and steps S003 to S209 that are shown in FIG. 3, as well as steps S301 to S305 that are shown in FIG. 9. By installing this program in the computer and executing it, it is possible to realize the transaction processing apparatus and the transaction processing method of Embodiment 3. In this case, a CPU (Central Processing Unit) of the computer functions as the transaction analyzer 101, the lock manager 102, and the transaction executor 103, and performs the processing.

Effects of Embodiment 3

As described above, according to Embodiment 3, the number of KV pairs that are to be updated by an execution target transaction input from the client 500 is specified, and the exclusive control method for an execution target transaction is set based on the specified number. According to Embodiment 3, it is thus possible to reduce an overhead caused due to retries of the transaction more efficiently.

Embodiment 4

Hereinafter, a transaction processing apparatus, a transaction processing method, and a program according to Embodiment 4 will be described with reference to FIGS. 14 and 15.

First, the configuration of the transaction processing apparatus of Embodiment 4 will be described with reference to FIG. 14. FIG. 14 is a block diagram illustrating a specific configuration of the transaction processing apparatus according to Embodiment 4.

Figure 14:
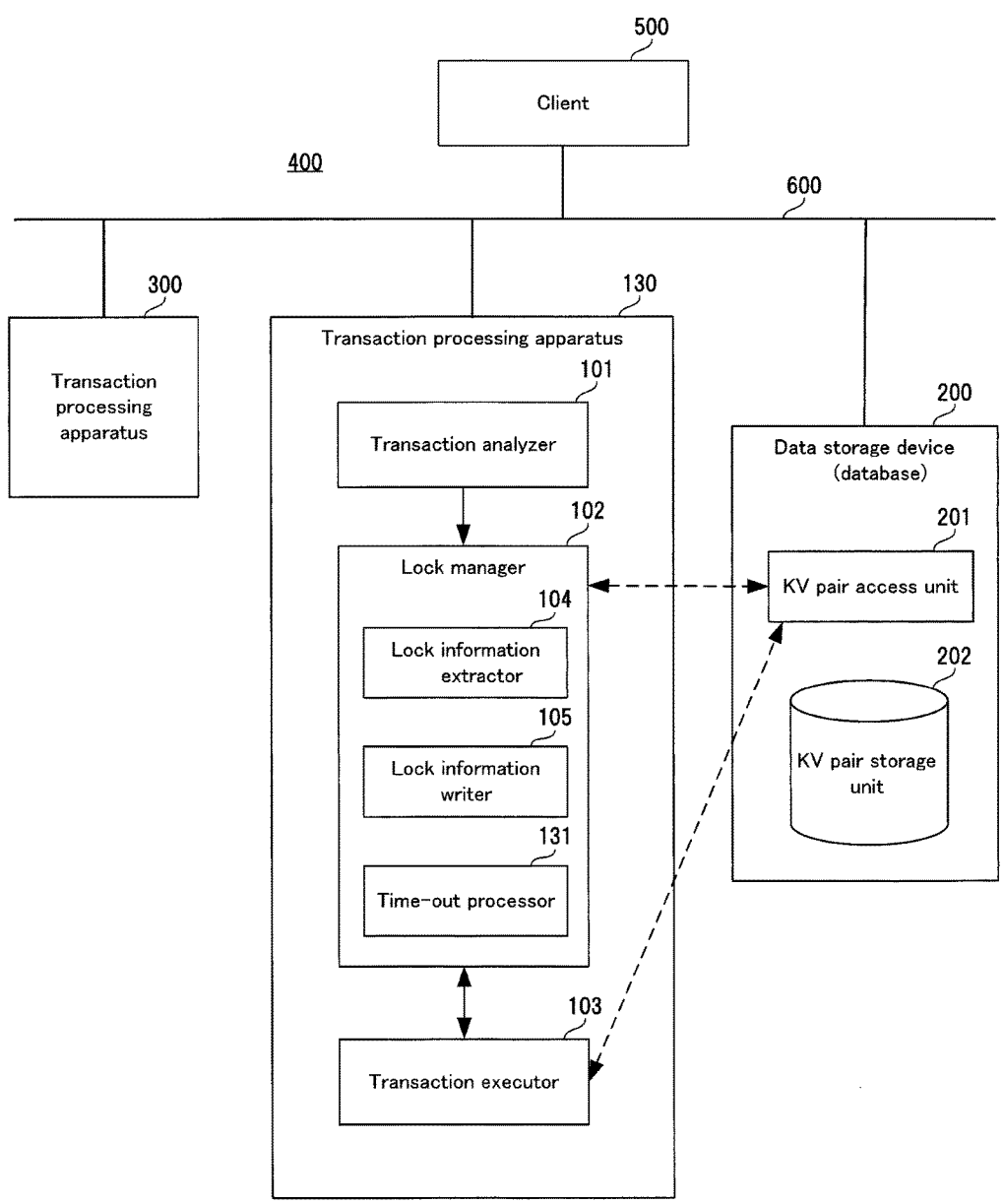
FIG. 14 is a block diagram illustrating a specific configuration of a transaction processing apparatus according to Embodiment 4.

As shown in FIG. 14, the transaction processing apparatus 130 according to Embodiment 4 includes the transaction analyzer 101, the lock manager 102, and the transaction executor 103, similarly to the transaction processing apparatus 100 of Embodiment 1 shown in FIG. 2.

However, in Embodiment 4, the transaction processing apparatus 130 further includes a time-out processor 131 in the lock manager 102, and differs from the transaction processing apparatus 100 of Embodiment 1 in this point. The difference from Embodiment 1 will mainly be described.

In Embodiment 4, the time-out processor 131 determines, with respect to an execution target transaction that has not completely been executed, whether or not an elapsed time from a reference time exceeds a threshold. Furthermore, the time-out processor 131 excludes, based on the result of the determination, the execution target transaction with respect to which the elapsed time from the reference time exceeds the threshold, from execution targets.

Specifically, the time-out processor 131 specifies, in the queue in which transaction information managed by the lock manager 102 is stored, transaction information with respect to which a predetermined time period has elapsed, and deletes the specified transaction information. Furthermore, in this context "predetermined time period" is a threshold, and is set in advance by the administrator of the transaction processing apparatus 130, or the like. Note that "predetermined time period" may be changed during the system operation.

Meanwhile, as described in Embodiment 1, if the transaction that acquires a lock to operate could not acquire the lock, the information on the transaction will be stored in a queue managed by the lock manager 102, and will be re-executed at a fixed interval. However, there is a possibility that the transaction is not started for a long time depending on the situation. In this case, the processing appears to the client 500 as being stalled.

Therefore, in Embodiment 3, among the transactions stored in the queue managed by the lock manager 102, a transaction that has not successfully acquired a lock for a long time is deleted from the queue, and an error is returned to the client 500.

Furthermore, in Embodiment 1 described above, the transaction information that is to be stored in the queue managed by the lock manager 102 includes only the transaction number and the key value that is accessed by the transaction. However, in Embodiment 3, in order to measure an elapsed time, a time at which the transaction was first executed is included in the transaction information.

[Apparatus Operation]

Hereinafter, the operation of the transaction processing apparatus 130 of Embodiment 4 will be described with reference to FIG. 15. Note that in Embodiment 4, the same processing as that of Embodiment 1 excluding re-execution processing of the transaction is performed. In other words, also in Embodiment 4, steps S001 to S209 shown in FIG. 3 are executed, as with in Embodiment 1. Accordingly, in the following, the re-execution processing of a transaction will mainly be described.

Furthermore, in the following description, FIG. 14 is appropriately referenced. Also in Embodiment 4, a transaction processing method is executed by the transaction processing apparatus 130 operating. Accordingly, the description of the transaction processing method in Embodiment 4 is replaced by the below description of the operation of the transaction processing apparatus 130.

Figure 15:
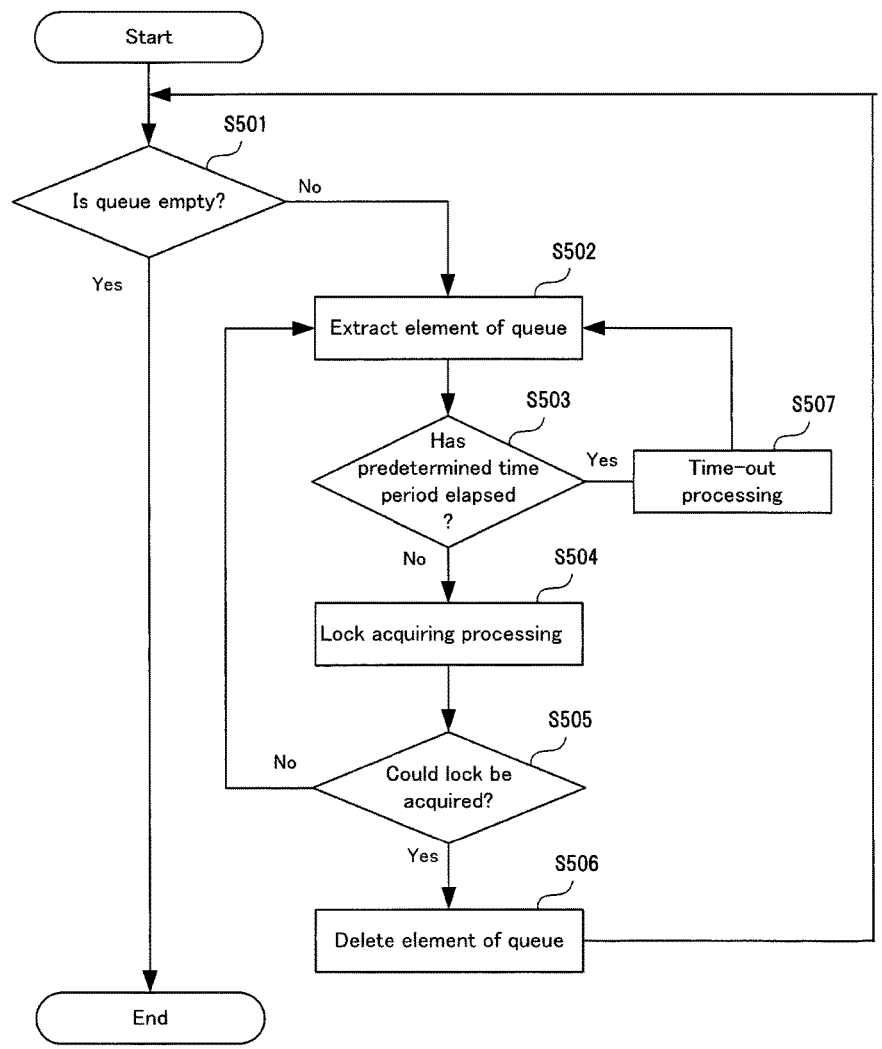
FIG. 15 is a flowchart illustrating the operation of transaction re-execution processing by the transaction processing apparatus according to Embodiment 4.

FIG. 15 is a flowchart illustrating the operation of the transaction re-execution processing by the transaction processing apparatus according to Embodiment 4. As shown in FIG. 15, first, the lock information extractor 104 determines whether or not transaction information is stored in the queue held by itself (step S501). Step S501 is the same step as step S301 shown in FIG. 9 of Embodiment 1.

If the result of the determination of step S501 shows that no transaction information is stored in the queue, the lock information extractor 104 ends the processing.

On the other hand, if the result of the determination of step S501 shows that transaction information is stored in the queue, the lock information extractor 104 extracts the transaction information, which is an element of the queue, stored in the head of the queue (step S502).

Then, the time-out processor 131 compares the time at which the transaction that corresponds to the transaction information extracted in step S502 was first executed with the current time, and determines whether or not the elapsed time from the first execution time is a predetermined time period or more (step S503).

If the result of the determination of step S503 shows that the elapsed time is the predetermined time period or more, the time-out processor 131 executes time-out processing (step S507). Specifically, the time-out processor 131 deletes the transaction information from the queue, and returns an error to the client.

On the other hand, if the result of the determination of step S503 described above shows that the elapsed time is not the predetermined time period or more, the lock information extractor 104 executes steps S504 to S506. Note that steps S504 to S506 are respectively the same steps as steps S303 to S305 shown in FIG. 9.

[Program]

A program according to Embodiment 4 may be a program that causes a computer to execute steps S001 to S209 shown in FIG. 3 as well as steps S501 to S507 shown in FIG. 15. By installing this program in the computer and executing it, it is possible to realize the transaction processing apparatus and the transaction processing method of Embodiment 4. In this case, a CPU (Central Processing Unit) of the computer functions as the transaction analyzer 101, the lock manager 102, and the transaction executor 103, and performs the processing.

Effects of Embodiment 4

As described above, according to Embodiment 4, if a transaction that is trying to acquire a lock cannot successfully acquire the lock for a long time, a time-out error can be issued, and thus it is possible to prevent the situation in which a result is not returned to the client 500 no matter how much time passes. Furthermore, upon receiving a time-out error, the client 500 can execute a countermeasure such as delaying the re-execution of a transaction.

(Physical Configuration)

Figure 16:
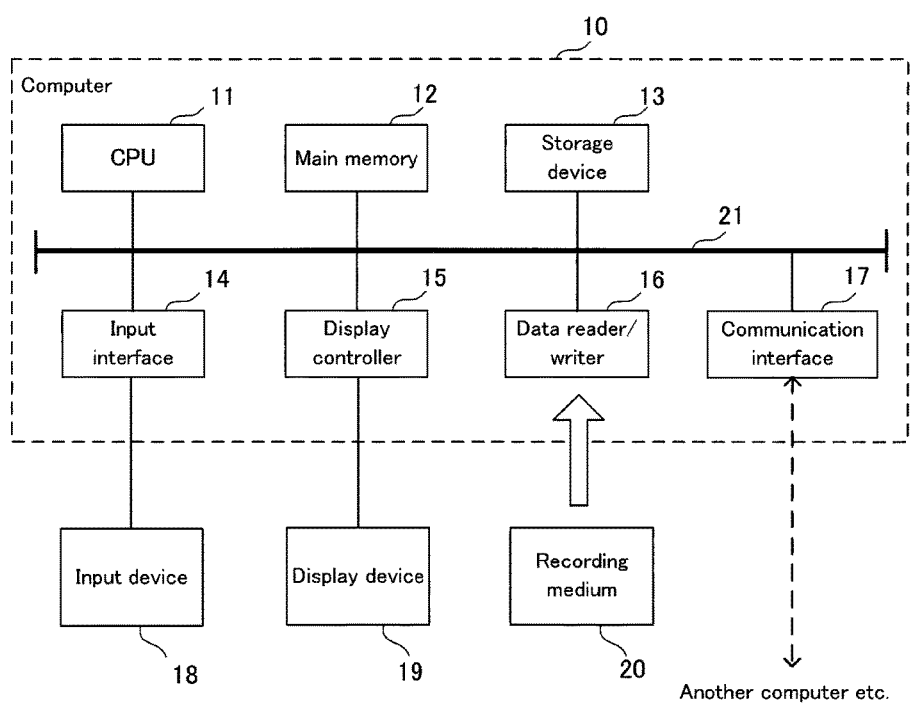
FIG. 16 is a block diagram illustrating an example of a computer that implements the transaction processing apparatuses according to Embodiments 1 to 4.

Hereinafter, a computer that implements the transaction processing apparatuses by executing the programs of Embodiments 1 to 4 will be described with reference to FIG. 16. FIG. 16 is a block diagram illustrating an example of the computer that implements the transaction processing apparatuses of Embodiments 1 to 4.

As shown in FIG. 16, a computer 10 is provided with a CPU 11, a main memory 12, a storage device 13, an input interface 14, a display controller 15, a data reader/writer 16, and a communication interface 17. These constituent components are connected to each other via a bus 21 so as to be capable of data communication.

The CPU 11 expands the programs (codes) according to the embodiments stored in the storage device 13 onto the main memory 12, and executes these programs in a predetermined order, so as to perform various operations. The main memory 12 is typically a volatile storage device such as a DRAM (Dynamic Random Access Memory). Furthermore, the program according to the embodiments are provided in the state of being stored in a computer-readable recording medium 20. Note that the programs according to the embodiments may be programs distributed on the Internet connected to the computer via the communication interface 17.

Furthermore, specific examples of the storage device 13 include not only a hard disk drive but also a semiconductor storage device such as a flash memory. The input interface 14 intermediates data transmission between the CPU 11 and an input device 18 such as a keyboard and a mouse. The display controller 15 is connected to a display device 19, and controls display on the display device 19.

The data reader/writer 16 intermediates data transmission between the CPU 11 and the recording medium 20, and executes reading of a program from the recording medium 20 and writing of the processing result in the computer 10 into the recording medium 20. The communication interface 17 intermediates data transmission between the CPU 11 and anther computer.

Furthermore, specific examples of the recording medium 20 include a general-purpose semiconductor storage device such as CF (Compact Flash (registered trademark)) and SD (Secure Digital), a magnetic storage medium such as a flexible disk, and an optical storage medium such as a CD-ROM (Compact Disk Read Only Memory).

A part or all of the above-described embodiments can be expressed in the following "Supplementary Note 1" to "Supplementary Note 24", but the present invention is not limited to the following description.

(Supplementary Note 1)

A transaction processing apparatus including:

a transaction analyzer that analyzes an execution target transaction to determine whether or not the execution target transaction is a transaction that acquires a lock to operate, and specifies, on a database, data that is to be accessed by the execution target transaction;

a lock manager that causes, if the execution target transaction is a transaction that acquires a lock to operate, the execution target transaction to acquire a lock; and a transaction executor that executes the execution target transaction on the condition that another transaction other than the execution target transaction has not acquired the lock, and updates, based on an execution result, the specified data that is to be accessed by the execution target transaction.

(Supplementary Note 2)

The transaction processing apparatus according to supplementary note 1, wherein the lock manager causes the transaction to acquire a lock by adding lock information to the specified data.

(Supplementary Note 3)

The transaction processing apparatus according to supplementary note 2, wherein if data that is to be accessed by a transaction and a key that is associated with the data are stored as pair data in the database, the transaction analyzer specifies pair data constituted by data that is to be accessed by the execution target transaction and a key that is associated with the data;

the lock manager instructs the database to write the lock information into a specific area of the specified pair data, using the key of the specified pair data, so as to cause the transaction to acquire a lock, and the transaction executor updates, after the execution of the transaction, the pair data stored in the database using the key of the specified pair data.

(Supplementary Note 4)

The transaction processing apparatus according to supplementary note 1, further including:

an exclusive control method setter that sets, as an exclusive control method for use in executing the execution target transaction, either a first exclusive control method that is not is to acquire a lock or a second exclusive control method that is to acquire a lock, wherein the transaction executor executes the execution target transaction in accordance with the set exclusive control method.

(Supplementary Note 5)

The transaction processing apparatus according to supplementary note 4, wherein when the first exclusive control method is set by the exclusive control method setter, the second exclusive control method is set instead of the first exclusive control method on the condition that the execution of the execution target transaction is not completed and a set condition is satisfied.

(Supplementary Note 6)

The transaction processing apparatus according to supplementary note 1, wherein the transaction analyzer further specifies the number of pieces of data that are to be accessed by the execution target transaction, based on the specified number of pieces of data, either a first exclusive control method that is not to acquire a lock or a second exclusive control method that is to acquire a lock is set as an exclusive control method for use in executing the execution target transaction, and the transaction executor executes the execution target transaction in accordance with the set exclusive control method.

(Supplementary Note 7)

The transaction processing apparatus according to supplementary note 6, wherein the transaction analyzer sets the first exclusive control method if the specified number of pieces of data is one, and sets the second exclusive control method if the specified number of pieces of data is two or more.

(Supplementary Note 8)

The transaction processing apparatus according to supplementary note 1, further including:

a time-out processor that determines with respect to an execution target transaction that has not completely been executed, whether or not an elapsed time from a reference time exceeds a threshold, and excludes, based on a determination result, the execution target transaction with respect to which the elapsed time from the reference time exceeds the threshold, from execution targets.

(Supplementary Note 9)

A transaction processing method including the steps of:

(a) analyzing an execution target transaction to determine whether or not the execution target transaction is a transaction that acquires a lock to operate, and specifying, on a database, data that is to be accessed by the execution target transaction;

(b) causing, if the execution target transaction is a transaction that acquires a lock to operate, the execution target transaction to acquire a lock; and (c) executing the execution target transaction on the condition that another transaction other than the execution target transaction has not acquired the lock, and updating, based on an execution result, the specified data that is to be accessed by the execution target transaction.

(Supplementary Note 10)

The transaction processing method according to supplementary note 9, wherein in step (b), the transaction is caused to acquire a lock by adding lock information to the specified data.

(Supplementary Note 11)

The transaction processing method according to supplementary note 10, wherein if data that is to be accessed by a transaction and a key that is associated with the data are stored as pair data in the database, in step (a), the pair data constituted by data that is to be accessed by the execution target transaction and a key that is associated with the data is specified, in step (b), the database is instructed to write the lock information into a specific area of the specified pair data using the key of the specified pair data, and the transaction is caused to acquire a lock, and in step (c), after the execution of the transaction, the pair data stored in the database is updated using the key of the specified pair data.

(Supplementary Note 12)

The transaction processing method according to supplementary note 9, further including the step of:

(d) setting, as an exclusive control method for use in executing the execution target transaction, either a first exclusive control method that is not to acquire a lock or a second exclusive control method that is to acquire a lock, wherein in step (c), the execution target transaction is executed in accordance with the exclusive control method that was set in step (d).

(Supplementary Note 13)

The transaction processing method according to supplementary note 12, wherein in step (d), when the first exclusive control method is set, the second exclusive control method is set instead of the first exclusive control method on the condition that the execution of the execution target transaction is not completed and a set condition is satisfied.

(Supplementary Note 14)

The transaction processing method according to supplementary note 9, wherein in step (a), the number of pieces of data that are to be accessed by the execution target transaction is specified, and based on the specified number of pieces of data, either the first exclusive control method that is not to acquire a lock or the second exclusive control method that is to acquire a lock is set as an exclusive control method for use in executing the execution target transaction, and in step (c), the execution target transaction is executed in accordance with the set exclusive control method.

(Supplementary Note 15)

The transaction processing method according to supplementary note 14, wherein in step (a), the first exclusive control method is set if the specified number of pieces of data is one, and the second exclusive control method is set if the specified number of pieces of data is two or more.

(Supplementary Note 16)

The transaction processing method according to supplementary note 9, further including the step of:

(e) determining, with respect to an execution target transaction that has not completely been executed, whether or not an elapsed time from a reference time exceeds a threshold, and removing, based on a determination result, the execution target transaction with respect to which the elapsed time from the reference time exceeds the threshold, from execution targets.

(Supplementary Note 17)

A non-transitory computer-readable recording medium having recorded thereon a program including an instruction for causing a computer to execute the steps of;

(a) analyzing an execution target transaction to determine whether or not the execution target transaction is a transaction that acquires a lock to operate, and specifying, on a database, data that is to be accessed by the execution target transaction;

(b) causing, if the execution target transaction is a transaction that acquires a lock to operate, the execution target transaction to acquire a lock; and (c) executing the execution target transaction on the condition that another transaction other than the execution target transaction has not acquired the lock, and updating, based on an execution result, the specified data that is to be accessed by the execution target transaction.

(Supplementary note 18)

The non-transitory computer-readable recording medium according to supplementary note 17, wherein in step (b), the transaction is caused to acquire a lock by adding lock information to the specified data.
(Supplementary Note 19)

The non-transitory computer-readable recording medium according to supplementary note 18, wherein if data that is to be accessed by a transaction and a key that is associated with the data are stored as pair data in the database, in step (a), the pair data constituted by data that is to be accessed by the execution target transaction and a key that is associated with the data is specified, in step (b), the database is instructed to write the lock information into a specific area of the specified pair data using the key of the specified pair data, and the transaction is caused to acquire a lock, and in step (c), after the execution of the transaction, the pair data stored in the database is updated using the key of the specified pair data.
(Supplementary Note 20)

The non-transitory computer-readable recording medium according to supplementary note 17, wherein the program further includes an instruction for causing the computer to further execute the step of:

(d) setting, as an exclusive control method for use in executing the execution target transaction, either a first exclusive control method that is not to acquire a lock or a second exclusive control method that is to acquire a lock, wherein in step (c), the execution target transaction is executed in accordance with the exclusive control method that was set in step (d).
(Supplementary Note 21)

The non-transitory computer-readable recording medium according to supplementary note 20, wherein in step (d), when the first exclusive control method is set, the second exclusive control method is set instead of the first exclusive control method on the condition that the execution of the execution target transaction is not completed and a set condition is satisfied.
(Supplementary Note 22)

The non-transitory computer-readable recording medium according to supplementary note 17, wherein in step (a), the number of pieces of data that are to be accessed by the execution target transaction is specified, and based on the specified number of pieces of data, either the first exclusive control method that is not to acquire a lock or the second exclusive control method that is to acquire a lock is set as an exclusive control method for use in executing the execution target transaction, and in step (c), the execution target transaction is executed in accordance with the set exclusive control method.
(Supplementary note 23)

The non-transitory computer-readable recording medium according to supplementary note 22, wherein in step (a), the first exclusive control method is set if the specified number of pieces of data is one, and the second exclusive control method is set if the specified number of pieces of data is two or more.
(Supplementary note 24)

The non-transitory computer-readable recording medium according to supplementary note 17, wherein the program further includes an instruction for causing the computer to execute the step of:

(e) determining, with respect to an execution target transaction that has not completely been executed, whether or not an elapsed time from a reference time exceeds a threshold, and removing, based on a determination result, the execution target transaction with respect to which the elapsed time from the reference time exceeds the threshold, from execution targets.

As described above, according to the present invention, it is possible to suppress an increase in overhead when update processing is concentrated as well as a reduction in scalability. The present invention is applicable to a distributed KVS system that uses an optimistic exclusive control method. The present invention is particularly advantageous for a workload including a large amount of writing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A transaction processing apparatus comprising:
   a memory storing instructions of a processing, the processing including:
   a transaction analyzer that analyzes an execution target transaction to determine whether or not the execution target transaction is a transaction that acquires a lock to operate, and specifies, on a database, data that is to be accessed by the execution target transaction, wherein:
   the transaction analyzer further specifies a number of pieces of data that are to be accessed by the execution target transaction, based on the specified number of pieces of data, either a first exclusive control method that is not to acquire a lock or a second exclusive control method that is to acquire a lock is set as a set exclusive control method for use in executing the execution target transaction;
   a lock manager that causes, if the execution target transaction is a transaction that acquires a lock to operate, the execution target transaction to acquire a lock;
   a transaction executor that executes the execution target transaction on the condition that another transaction other than the execution target transaction has not acquired the lock, and updates, based on an execution result, the specified data that is to be accessed by the execution target transaction, wherein:
   the transaction executor executes the execution target transaction in accordance with the set exclusive control method; and
   a Central Processing Unit (CPU) performing the processing.

2. The transaction processing apparatus according to claim 1,
   wherein the lock manager causes the transaction to acquire a lock by adding lock information to the specified data.

3. The transaction processing apparatus according to claim 2,
   wherein if data that is to be accessed by a transaction and a key that is associated with the data are stored as pair data in the database,
   the transaction analyzer specifies pair data constituted by data that is to be accessed by the execution target transaction and a key that is associated with the data;
   the lock manager instructs the database to write the lock information into a specific area of the specified pair data, using the key of the specified pair data, so as to cause the transaction to acquire a lock, and the transaction executor updates, after the execution of the transaction, the pair data stored in the database using the key of the specified pair data.

4. The transaction processing apparatus according to claim 1, the processing further comprising:
an exclusive control method setter that sets, as an exclusive control method for use in executing the execution target transaction, either a first exclusive control method that is not to acquire a lock or a second exclusive control method that is to acquire a lock,
wherein the transaction executor executes the execution target transaction in accordance with the set exclusive control method.

5. The transaction processing apparatus according to claim 4,
wherein when the first exclusive control method is set by the exclusive control method setter, the second exclusive control method is set instead of the first exclusive control method on the condition that the execution of the execution target transaction is not completed and a set condition is satisfied.

6. The transaction processing apparatus according to claim 1, wherein the transaction analyzer sets the first exclusive control method if the specified number of pieces of data is one, and sets the second exclusive control method if the specified number of pieces of data is two or more.

7. The transaction processing apparatus according to claim 1, the processing further comprising:
a time-out processor that determines with respect to an execution target transaction that has not completely been executed, whether or not an elapsed time from a reference time exceeds a threshold, and excludes, based on a determination result, the execution target transaction with respect to which the elapsed time from the reference time exceeds the threshold, from execution targets.

8. A transaction processing method comprising:
(a) analyzing, by a CPU, an execution target transaction to determine whether or not the execution target transaction is a transaction that acquires a lock to operate, and specifying, on a database, data that is to be accessed by the execution target transaction, wherein:
a number of pieces of data that are to be accessed by the execution target transaction is specified, and based on the specified number of pieces of data, either a first exclusive control method that is not to acquire a lock or a second exclusive control method that is to acquire a lock is set as a set exclusive control method for use in executing the execution target transaction;

(b) causing, by the CPU, if the execution target transaction is a transaction that acquires a lock to operate, the execution target transaction to acquire a lock; and (c) executing, by the CPU, the execution target transaction on the condition that another transaction other than the execution target transaction has not acquired the lock, and updating, based on an execution result, the specified data that is to be accessed by the execution target transaction, wherein:

the execution target transaction is executed in accordance with the set exclusive control method.

9. A non-transitory computer-readable recording medium having recorded thereon a program including an instruction for causing a computer to execute comprises:

(a) analyzing an execution target transaction to determine whether or not the execution target transaction is a transaction that acquires a lock to operate, and specifying, on a database, data that is to be accessed by the execution target transaction, wherein:

a number of pieces of data that are to be accessed by the execution target transaction is specified, and based on the specified number of pieces of data, either a first exclusive control method that is not to acquire a lock or a second exclusive control method that is to acquire a lock is set as a set exclusive control method for use in executing the execution target transaction;

(b) causing, if the execution target transaction is a transaction that acquires a lock to operate, the execution target transaction to acquire a lock; and (c) executing the execution target transaction on the condition that another transaction other than the execution target transaction has not acquired the lock, and updating, based on an execution result, the specified data that is to be accessed by the execution target transaction, wherein:

the execution target transaction is executed in accordance with the set exclusive control method.

* * * * *